(12) United States Patent
Lejeune et al.

(10) Patent No.: US 7,732,552 B2
(45) Date of Patent: Jun. 8, 2010

(54) LOW VOC EPOXY SILANE OLIGOMER AND COMPOSITIONS CONTAINING SAME

(75) Inventors: Alain Lejeune, Reignier (FR); Yves Gentil, Cranves-Sales (FR)

(73) Assignee: Momentive Performance Materials Inc., Albany, NY (US)

( * ) Notice: Subject to any disclaimer, the term of this patent is extended or adjusted under 35 U.S.C. 154(b) by 1043 days.

(21) Appl. No.: 11/341,800

(22) Filed: Jan. 27, 2006

(65) Prior Publication Data

US 2007/0179268 A1    Aug. 2, 2007

(51) Int. Cl.
*C08G 77/00* (2006.01)
*C08G 77/04* (2006.01)
*C08G 77/06* (2006.01)
*C08G 77/18* (2006.01)

(52) U.S. Cl. .............................. 528/10; 528/12; 528/18; 528/23; 528/26; 528/29

(58) Field of Classification Search ................. 556/450; 528/10, 12, 21, 23, 17, 18, 26, 29
See application file for complete search history.

(56) References Cited

U.S. PATENT DOCUMENTS

| | | | |
|---|---|---|---|
| 5,366,768 A | 11/1994 | Kasari et al. | |
| 6,069,259 A * | 5/2000 | Crivello | 549/214 |
| 6,270,884 B1 | 8/2001 | Guhde et al. | |
| 6,391,999 B1 | 5/2002 | Crivello | |
| 6,656,607 B1 | 12/2003 | Rouquier et al. | |
| 7,595,372 B2 * | 9/2009 | Lejeune et al. | 528/12 |

FOREIGN PATENT DOCUMENTS

| | | |
|---|---|---|
| EP | 0 291 260 B1 | 11/1988 |
| WO | 01/18128 | 3/2001 |
| WO | 01/53385 | 7/2001 |
| WO | 2006/110331 | 10/2006 |
| WO | 2007/067203 | 6/2007 |

* cited by examiner

*Primary Examiner*—Randy Gulakowski
*Assistant Examiner*—Kara Negrelli
(74) *Attorney, Agent, or Firm*—Dominck G. Vicari; Joseph S. Ostroff

(57) ABSTRACT

A process for producing a low VOC epoxy silane oligomer which includes the reaction of an epoxy silane with water in a water to silane molar ratio of from 0.1 to 1.5, in which the epoxy silane is the reaction product of an epoxy alkoxy-substituted silane and a diol or a dicarboxylic acid.

51 Claims, No Drawings

LOW VOC EPOXY SILANE OLIGOMER AND COMPOSITIONS CONTAINING SAME

BACKGROUND OF THE INVENTION

There is extensive literature describing the use of monomeric epoxy functional silanes. Such silanes are used either alone or combined with appropriate polymers. However, one of the main difficulties in the use of monomeric epoxy silanes in water is their sensitivity to hydrolysis and condensation which is difficult to control. In addition, the stability of the epoxy functionalities when using the monomeric epoxy silanes in water is difficult to control because of the tendency of the epoxy functionalities to exhibit ring opening.

The use of pre-hydrolyzed and pre-condensed silanes is one answer to such concerns. A pre-hydrolyzed and condensed silane can be an oligomeric structure that has specific features like controlled molecular weight, usually good film formation capabilities and dispersion properties because the silane terminations are already partially or totally condensed, and faster curing rates. This aspect of the oligomers makes them attractive to the coatings industry as it broadens the field of applications and also helps to get faster application or formulation properties. However, the high molecular weight oligomers can condense further to larger siloxane networks, which result in the formation of structures that are difficult to make water-soluble.

For example, U.S. Pat. No. 6,391,999 discloses multi-functional epoxy siloxane oligomers for use in a solventless or solvent-based system. These multifunctional epoxy siloxane oligomers have high molecular weights and an insignificant amount of residual silane functional groups. Thus, it is very difficult to make the oligomers water-soluble.

Another disadvantage of the use of monomeric epoxy silanes is that they release a large amount of volatile organic compounds (VOCs) expressed as alcohol content introduced by the alkoxy functionalities.

A general trend of the industry is to decrease or eliminate the release of VOCs or hazardous air pollutants (HAPS). It is desirable to reduce the methanol content of any structure that could be involved in coatings, adhesives and sealant applications.

It is also desirable to prepare water-based coatings, which are resistant to chemicals as well as corrosion resistant based on metallic powders like aluminum, zinc, bronze and other metallic or organic pigments. Metallic pigments being sensitive to water, there is also a need to have superior protection of such metallic powders in water against a well-known mechanism called hydrogen evolution.

It is also desirable to design water-based coatings that have superior adhesion properties, mechanical or chemical resistances with outstanding weathering behaviors and that can be applied on a variety of substrates such as metallic or plastic substrates, cellulosic or natural substrates, concrete and any other material generally used in the coatings and adhesives & sealant industries.

Therefore, there is a need to produce an epoxy silane oligomer that is useful in a solvent-less or solvent-based system to reduce the amount of VOC and/or HAPS emissions. There is also a need for an epoxy silane oligomer structure having epoxy functional groups to be used in waterborne systems for corrosion protection, zinc rich primers, shop primers, metallic pigment dispersions or other coating applications.

BRIEF DESCRIPTION OF THE INVENTION

In accordance with the present invention, a process for producing a low volatile organic compound epoxy silane oligomer is provided which comprises hydrolyzing an epoxy silane, the epoxy silane upon hydrolysis of its hydrolyzable sites producing a reduced amount of volatile organic compound compared to that produced by the hydrolysis of a silane possessing an equivalent number, per mole, of hydrolyzable sites all of which are hydrolyzable alkoxy groups, the hydrolyzing of the epoxy silane being carried out with less than 1.5 equivalents of water, said water being continuously fed during the hydrolysis reaction.

It is to be understood that the present invention is not limited to waterborne coatings. It includes uses of low VOC silanes for any type of coating or surface treatment for architectural, industrial maintenance, decorative, protective or other coatings. Examples of coating systems are automotive clearcoats, powder coatings, hardcoats such as those used in the production of plastic automotive headlamp lenses, silane-based metal conversion coatings and radiation cured coatings.

The expression "volatile organic compound" (VOC) as used herein shall be understood to apply to and designate substantially pure organic compounds that are volatile per the United States Environmental Protection Agency (EPA) Method 24 and/or do not meet specific criteria established for countries within Europe with respect to vapor pressure or boiling point or are cited as VOCs in European Union Directive 2004/42/EC. Specific examples of such VOCs include methanol, ethanol, propanol, isopropanol, acetoxysilanes, etc.

Various other features, aspects, and advantages of the present invention will become more apparent with reference to the following description and appended claims.

DETAILED DESCRIPTION OF THE INVENTION

A process for producing a low VOC epoxy silane oligomer is provided which comprises hydrolyzing an epoxy silane, the epoxy silane upon hydrolysis of its hydrolyzable sites producing a reduced amount of volatile organic compound compared to that produced by the hydrolysis of a silane possessing an equivalent number of hydrolyzable sites all of which are hydrolyzable alkoxy groups, the hydrolyzing of the epoxy silane being carried out with less than 1.5 equivalents of water, said water being continuously fed during the hydrolysis reaction Epoxy silanes, or silanes, suitable for the present invention include epoxy silanes of the general formula:

$$[Y[-G(-SiX_uZ^b{}_v Z^c{}_w)_s]_r]_n \qquad \text{(Formula 1)}$$

Wherein each occurrence of G is independently a polyvalent group derived from the substitution of one or more hydrogen atoms of an alkyl, alkenyl, aryl or aralkyl group, or a group obtained by removal of one or more hydrogen atoms of a heterocarbon, with G containing from about 1 to about 30 carbon atoms; each occurrence of X is independently —Cl, —Br, $R^1O$—, $R^1C(\!=\!O)O$—, hydroxycarboxylic acids, $R^1R^2C\!=\!NO$—, $R^1R^2NO$— or $R^1R^2N$—, —$R^1$, —$(OSiR^1R^2)_t(OSiR^1R^2R^3)$, and —$O(R^{10}CR^{11})_fOH$, wherein each occurrence of $R^1$, $R^2$, $R^3$, $R^{10}$, and $R^{11}$ is independently R; each occurrence of $Z^b$ is independently selected from the group consisting of (—O—)$_{0.5}$, [—O($R^{10}CR^{11}$)$_f$ O—]$_{0.5}$, [—NR$^4$-L$^1$-NR$^5$—]$_{0.5}$, [—OC(=O)R$^{10}$CR$^{11}$C(=O)O—]$_{0.5}$ except succinic, maleic or phthalic acid, an alkanolamine, an acetylenic glycol, a polysiloxane diol, a polyether siloxane diol and a polyhydroxy compound where these groups form bridging bonds between silicon atom centers, wherein each occurrence of R$^{10}$ and R$^{11}$ is independently R and each occurrence of L$^1$ is independently G; each occurrence of Z$^c$ is independently selected from the group consisting of —O(R$^{10}$CR$^{11}$)$_f$O—, —NR$^4$-L$^1$-NR$^5$—, —OC(=O)R$^{10}$CR$^{11}$C(=O)O— except succinic, maleic or phthalic acid, an alkanolamine, an acetylenic glycol, a polysiloxane diol, a polyether siloxane diol and a polyhydroxy compound where these groups form cyclic bonds with a silicon atom center, wherein each occurrence of R$^{10}$ and R$^{11}$ is independently R and each occurrence of L$^1$ is independently G; each occurrence of R is hydrogen, straight alkyl, cyclic alkyl, branched alkyl, alkenyl, aryl, aralkyl, an ether, polyether, or a group obtained by removal of one or more hydrogen atoms of a heterocarbon; each occurrence of R contains from 1 to about 20 carbon atoms; each occurrence of the subscript f is an integer of from 1 to about 15; each occurrence of n is an integer of from 1 to about 100, with the proviso that when n is greater than 1; v is greater than 0 and all of the valences for Z$^b$ have a silicon atom bonded to them; each occurrence of the subscript u is an integer of from 0 to about 3; each occurrence of the subscript v is an integer of from 0 to about 3; each occurrence of the subscript w is an integer of from 0 to about 1, with the proviso that u+v+2w=3; each occurrence of the subscript r is an integer of from 1 to about 6; each occurrence of the subscript t is an integer of from 0 to about 50; each occurrence of the subscript s is an integer of from 1 to about 6; each occurrence of Y includes an organofunctional group of valence r and at least one epoxy functional group; and at least one cyclic and bridging organofunctional silane comprising the cyclic and bridging organofunctional silane composition containing at least one occurrence of Z$^b$ or Z$^c$.

In the silane of Formula 1, the organofunctional group herein includes univalent organofunctional groups (r=1), divalent organofunctional groups (r=2), trivalent organofunctional groups (r=3), tetravalent organofunctional groups (r=4), as well as organofunctional groups of higher valency, herein referred to as polyvalent organofunctional groups. The term polyvalent organofunctional group herein shall be understood to include univalent, divalent, trivalent, and tetravalent organofunctional groups.

In another embodiment of the silane of Formula 1, Z$^b$ is independently (—O—)$_{0.5}$; [—O(R$^{10}$CR$^{11}$)$_f$O—]$_{0.5}$; a diamine such as ethylenediamine to form a bridged silazane, [—NR$^4$-L$^1$-NR$^5$—]$_{0.5}$; an alkanolamine such as 2-aminoethanol; a dicarboxylic acid such as adipic acid, malonic acid, etc., to form bridged carboxysilanes, [—OC(=O)R$^{10}$CR$^{11}$C(=O)O—]$_{0.5}$ except succinic, maleic or phthalic acid; an acetylenic glycol including polyalkoxylated variants such as Surfynol® surfactants available from Air Products; or polyvinylalcohol.

Another embodiment of the present invention herein includes Z$^c$ is independently a diol-derived alkoxy group, —O(R$^{10}$CR$^{11}$)$_f$O—; a diamine such as ethylenediamine to form a cyclic silazane, —NR$^4$-L$^1$-NR$^5$—; an alkanolamine such as 2-aminoethanol; a dicarboxylic acid such as adipic acid, malonic acid, etc., to form cyclic carboxysilanes, —OC(=O)R$^{10}$CR$^{11}$C(=O)O— except succinic, maleic or phthalic acid; an acetylenic glycol including polyalkoxylated variants such as Surfynol® surfactants available from Air Products; or polyvinylalcohol.

Diol-derived organofunctional silanes in which the silanes contain cyclic and bridged alkoxy groups derived from hydrocarbon-based diols; cyclic and bridging organofunctional silane compositions; diamines such as ethylenediamine, —NR$^4$-L$^1$-NR$^5$—; alkanolamines such as 2-aminoethanol; dicarboxylic acids such as adipic acid or malonic acid, —OC(=O)R$^{10}$CR$^{11}$C(=O)O— except succinic, maleic or phthalic acid; acetylenic glycols including polyalkoxylated variants such as Surfynol® surfactants available from Air Products; or polyhydroxy compounds such as polyvinylalcohol used to make silane ester described herein eliminate or greatly mitigate the release of alcohol during use or manufacturing in which a silane silicon reacts with a monomer or polymer.

Another embodiment of the present invention herein includes X is independently selected from the group consisting of —Cl, —Br, R$^1$O—, R$^1$C(=O)O—, hydroxyacids such as glycolic acid, R$^1$R$^2$C=NO—, R$^1$R$^2$NO— or R$^1$R$^2$N—, —R$^1$, —(OSiR$^1$R$^2$)$_t$(OSiR$^1$R$^2$R$^3$), —O(R$^{10}$CR$^{11}$)$_f$OH and —O(R$^{10}$CR$^{11}$)$_f$OCH$_3$, wherein each occurrence of R$^1$, R$^2$, R$^3$, R$^{10}$ and R$^{11}$ is independently R, ester alcohols such as Texanol® available from Eastman Chemicals (2,2,4-Trimethyl-1,3-pentanediol monoisobutyrate) and other solvents that are not classified as VOCs per European Union Directive 2004/42/EC.

Another embodiment of the present invention herein includes univalent organofunctional groups such as mercapto and acyloxy groups such as acryloxy, methacryloxy and acetoxy. Another exemplary embodiment of the present invention herein includes univalent epoxys such as glycidoxy, —O—CH$_2$—C$_2$H$_3$O; epoxycyclohexylethyl, —CH$_2$—CH$_2$—C$_6$H$_9$O; epoxycyclohexyl, —C$_6$H$_9$O; epoxy, —CR$^6$(—O—)CR$^4$R$^5$. Another embodiment of the present invention herein includes univalent organofunctional groups such as vinyl, —CH=CH$_2$, allyl, —C—CH=CH$_2$, or methallyl, —C—CH=CHCH$_3$. Another embodiment of the present invention herein includes univalent organofunctional groups such as hydroxy, carbamate, —NR$^4$C(=O)OR$^5$; urethane, —OC(=O)NR$^4$R$^5$; thiocarbamate, —NR$^4$C(=O)SR$^5$; thiourethane, —SC(=O)NR$^4$R$^5$; thionocarbamate, —NR$^4$C(=S)OR$^5$; thionourethane, —OC(=S)NR$^4$R$^5$; dithiocarbamate, —NR$^4$C(=S)SR$^5$; and dithiourethane, —SC(=S)NR$^4$R$^5$. Another embodiment of the present invention herein includes univalent organofunctional groups such as maleimide; maleate and substituted maleate; fumurate and substituted fumurate; nitrile, CN; citraconimide. Another exemplary embodiment of the present invention herein includes univalent organofunctional groups such as cyanate, —OCN; isocyanate, —N=C=O; thiocyanate, —SCN; isothiocyanate, —N=C=S; and ether, —OR$^4$. Another embodiment of the present invention herein includes univalent organofunctional groups such as fluoro, —F; chloro, —Cl; bromo, —Br; iodo, —I; and thioether, —SR$^4$. Another embodiment of the present invention herein includes univalent organofunctional groups such as disulfide, —S—SR$^4$; trisulfide, —S—S—SR$^4$; tetrasulfide, —S—S—S—SR$^4$; pentasulfide, —S—S—S—S—SR$^4$; hexasulfide, —S—S—S—S—S—SR$^4$; and polysulfide, —S$_x$R$^4$. Another embodiment of the present invention herein includes univalent organofunctional groups such as xanthate, —SC(=S)OR$^4$; trithiocarbonate, —SC(=S)SR$^4$; dithiocarbonate, —SC(=O)SR$^4$; ureido, —NR$^4$C(=O)NR$^5$R$^6$; thionoureido (also better known as thioureido), —NR$^4$C(=S)NR$^5$R$^6$; amide, R$^4$C(=O)NR$^5$— and —C(=O)NR$^4$R$^5$—; thionoamide (also better known as thioamide), R$^4$C(=S)NR$^4$—; univalent melamino; and, univalent cyanurato. Another embodiment of the present invention herein includes univalent organofunctional groups such as primary amino, —NH$_2$; secondary amino, —NHR$^4$; and tertiary amino, —NR$^4$R$^5$ univalent diamino, —NR$^4$-L$^1$-

$NR^5R^6$; univalent triamino, $—NR^4-L^1(-NR^5R^6)_2$ and $—NR^4-L^1-NR^5-L^2-NR^6R^7$; and univalent tetraamino, $—NR^4-L^1(—NR^5R^6)_3$, $—NR^4-L^1-NR^5-L^2-NR^6-L^3-NR^7R^8$, and $—NR^4-L^1-N(-L^2NR^5R^6)_2$; wherein each occurrence of $L^1$, $L^2$, and $L^3$ is selected independently from the set of structures given above for G; each occurrence of $R^4$, $R^5$, $R^6$, $R^7$ and $R^8$ is independently given by one of the structures listed above for R; and each occurrence of the subscript, x, is independently given by x is 1 to 10.

Another embodiment of the present invention herein includes divalent organofunctional groups such as epoxy, $-(-)C(—O—)CR^4R^5$ and $—CR^5(—O—)CR^4—$; or oxetane, $-(-)CCH_2(—O—)CR^4R^5—$ and $-(-)CR^5CH_2(—O—)CR^4—$. Another embodiment of the present invention herein includes divalent organofunctional groups such as carbamate, $-(-)NC(=O)OR^5$; urethane, $—OC(=O)NR^4—$; thiocarbamate, $-(-)NC(=O)SR^5$; thiourethane, $—SC(=O)NR^4—$; thionocarbamate, $-(-)NC(=S)OR^5$; thionourethane, $—OC(=S)NR^4—$; dithiocarbamate, $-(-)NC(=S)SR^5$; dithiourethane, $—SC(=S)NR^4—$; and ether, $—O—$. Another embodiment of the present invention herein includes divalent organofunctional groups such as maleate and substituted maleate; fumurate and substituted fumurate. Another embodiment of the present invention herein includes thioether, $—S—$; disulfide, $—S—S—$; trisulfide, $—S—S—S—$; tetrasulfide, $—S—S—S—S—$; pentasulfide, $—S—S—S—S—S—$; hexasulfide, $—S—S—S—S—S—S—$; and polysulfide, $—S_x—$. Another embodiment of the present invention herein includes divalent organofunctional groups such as xanthate, $—SC(=S)O—$; trithiocarbonate, $—SC(=S)S—$; dithiocarbonate, $—SC(=O)S—$; ureido, $-(-)NC(=O)NR^4R^5$ and $—NR^4C(=O)NR^5—$; thionoureido, also better known as thioureido, $-(-)NC(=S)NR^4R^5$ and $—NR^4C(=S)NR^5—$; amide, $R^4C(=O)N(-)-$ and $—C(=O)NR^4—$; thionoamide, also better known as thioamide, $R^4C(=S)N(-)-$; divalent melamino; divalent cyanurato. Another embodiment of the present invention herein includes divalent organofunctional groups such as secondary amino, $—NH—$; tertiary amino, $—NR^4—$; divalent diamino, $-(-)N-L^1-NR^4R^5$ and $—NR^4-L^1-NR^5—$; divalent triamino, $(-)NR^4)_2-L^1-NR^5R^6$, $-(-)N-L^1-NR^5-L^2-NR^6R^7$, $—NR^4-L^1-N(-)-L^2-NR^5R^6$, and $—NR^4-L^1-NR^5-L^2-NR^6—$; and divalent tetramino, $-(-)N-L^1-(NR^5R^6)_3$, $(—NR^4)_2-L^1-(NR^5R^6)_2$, $-(-)N-L^1-NR^4-L^2-NR^5-L^3-NR^6R^7$, $—NR^4-L^1-N(-)-L^2-NR^5-L^3-NR^6R^7$, $—NR^4-L^1-NR^5-L^2-N(-)-L^3-NR^6R^7$, $—NR^4-L^1-NR^5-L^2-NR^6-L^3-NR^7—$, $-(-)N-L^1-N(-L^2NR^5R^6)_2$, and $(—NR^4-L^1-)_2N-L^2NR^5R^6$; wherein each occurrence of $L^1$, $L^2$, and $L^3$ is selected independently from the set of structures given above for G; each occurrence of $R^4$, $R^5$, $R^6$, and $R^7$ is independently given by one of the structures listed above for R; and each occurrence of the subscript, x, is independently given by x is 1 to 10.

Another embodiment of the present invention herein includes trivalent organofunctional groups such as epoxy, $-(-)C(—O—)CR^4—$ or oxetane, $-(-)CCH_2(—O—)CR^4—$. Another embodiment of the present invention herein includes trivalent organofunctional groups such as herein carbamate, $-(-)NC(=O)O—$; thiocarbamate, $-(-)NC(=O)S—$; thionocarbamate, $-(-)NC(=S)O—$; and dithiocarbamate, $-(-)NC(=S)S—$; ureido, $-(-)NC(=O)NR^4—$; thionoureido, also better known as thioureido, $-(-)NC(=S)NR^4—$; amide, $—C(=O)N(-)-$; thionoamide, also better known as thioamide, $—C(=S)N(-)-$; trivalent melamino; and trivalent cyanurato. Another embodiment of the present invention herein includes trivalent organofunctional groups such as tertiary amino, $—N(-)-$; trivalent diamino, $-(-)N-L^1-NR^4—$; trivalent triamino, $(—NR^4)_3-L^1$, $(—NR^4)_2-L^1-NR^5—$, $-(-)N-L^1-N(-)-L^2-NR^3R^4$, $—NR^4-L^1-N(-)-L^2-NR^5—$, and $-(-)N-L^1-NR^4-L^2-NR^5—$; and trivalent tetramino, $-(-)N-L^1-N(-)-L^2-NR^5-L^3-NR^3R^4$, $—NR^4-L^1-N(-)-L^2-N(-)-L^3-NR^3R^4$, $-(-)N-L^1-NR^5-L^2-N(-)-L^3-NR^3R^4$, $—NR^4-L^1-N(-)-L^2-NR^3-L^3-NR^4—$, $-(-)N-L^1-N(-L^2NR^3R^4)(-L^2NR^5—)$, and $(—NR^4-L^1-)_3N$; wherein each occurrence of $L^1$, $L^2$, and $L^3$ is selected independently from the set of structures given above for G; and each occurrence of $R^4$, $R^5$, and $R^6$ is independently given by one of the structures listed above for R.

Another embodiment of the present invention herein includes tetravalent organofunctional group such as epoxy, $-(-)C(—O—)C(-)-$; Another embodiment of the present invention herein includes tetravalent organofunctional groups such as ureido, $-(-)NC(=O)N(-)-$; thionoureido (also better known as thioureido), $-(-)NC(=S)N(-)-$; and tetravalent melamino. Another embodiment of the present invention herein includes tetravalent organofunctional groups tetravalent diamino, $-(-)N-L^1-N(-)-$; tetravalent triamino, $(—NR^4)_4-L^1$, $(—NR^4)_2-L^1-N(-)-$, $-(-)N-L^1-N(-)-L^2-NR^3—$, and $-(-)N-L^1-NR^4-L^2(-)-$; and tetravalent tetramino, $-(-)N-L^1-N(-)-L^2-N(-)-L^3-NR^4R^3$, $—NR^4-L^1-N(-)-L^2-N(-)-L^3-NR^3—$, $-(-)N-L^1-NR^4-L^2-NR^3-L^3-N(-)-$, and $-(-)N-L^1-N(-L^2NR^3—)_2$; wherein each occurrence of $L^1$, $L^2$, and $L^3$ is selected independently from the set of structures given above for G; and each occurrence of $R^4$ and $R^5$ is independently given by one of the structures listed above for R.

Another embodiment of the present invention herein includes polyvalent organofunctional groups such as, but is not limited to, polyvalent hydrocarbon groups; pentavalent melamino, $(—NR^3)(—N—)_2C_3N_3$; hexavalent melamino, $(—N—)_3C_3N_3$; pentavalent triamino, $-(-)N-L^1-N(-)-L^2-N(-)-$; pentavalent tetramino, $-(-)N-L^1-N(-)-L^2-N(-)-L^3-NR^3—$, $-(-)N-L^1-NR^3-L^2-N(-)-L^3-N(-)-$, and $[-(-)N-L^1-]_2N-L^2NR^3—$; and hexavalent tetramino, $-(-)N-L^1-N(-)-L^2-N(-)-L^3-N(-)-$ and $[-(-)N-L^1-]_3N$; wherein each occurrence of $L^1$, $L^2$, and $L^3$ is selected independently from the set of structures given above for G; and each occurrence of $R^4$ is independently given by one of the structures listed above for R.

As used herein, diol, hydrocarbon diol, and difunctional alcohol refer to a compound of structural Formula 2:

$$HO(R^{10}CR^{11})_fOH \qquad \text{(Formula 2)}$$

wherein f, $R^{10}$, and $R^{11}$ are as defined above. These compounds include represent hydrocarbons or heterocarbons in which two hydrogen atoms are replaced with OH in accordance with the structures drawn in Formula 2. As used herein, dialkoxy and difunctional alkoxy refer to a hydrocarbon diol, as defined herein, in which the hydrogen atoms of the two OH groups have been removed to a give divalent radical, and whose structure is given by Formula 3:

$$—O(R^{10}CR^{11})_fO— \qquad \text{(Formula 3)}$$

wherein f, $R^{10}$, and $R^{11}$ are as defined above. As used herein, cyclic refers to a silane or group in which cyclization is about silicon, by two oxygen atoms each attached to a common divalent hydrocarbon or heterocarbon group, such as is commonly found in diols. Cyclic groups; diol-derived alkoxy groups, $—O(R^{10}CR^{11})_fO—$; diamines such as ethylenediamine, $—NR^4-L^1-NR^5—$; alkanolamines such as 2-aminoethanol; dicarboxylic acids such as adipic acid or malonic acid, $—OC(=O)R^{10}CR^{11}C(=O)O—$ except succinic, maleic or phthalic acid; acetylenic glycols including polyalkoxylated variants such as Surfynol® surfactants available from Air Products; and polyvinylalcohol used to make silane esters described herein are represented by $Z^c$. As used herein, bridging refers to a silane or group in which two different silicon atoms are each bound to one oxygen atom, which is in turn bound to a common divalent hydrocarbon or heterocarbon group as defined herein, such as is commonly found in diols. Bridging groups; diamines such as ethylenediamine, —NR$^4$-L$^1$-NR$^5$—; alkanolamines such as 2-aminoethanol; dicarboxylic acids such as adipic acid or malonic acid, —OC(=O)R$^{10}$CR$^{11}$C(=O)O— except succinic, maleic or phthalic acid; acetylenic glycols including polyalkoxylated variants such as Surfynol® surfactants available from Air Products; or polyvinylalcohol used to make silane esters described herein are represented by $Z^b$. As used herein, cyclic and bridging refers to a silane or group encompassing cyclic only, without bridging; bridging only, without cyclic; and any combination of both cyclic and bridging. Thus, a cyclic and bridging silane could mean, for example, a silane with a silicon atom bound to a cyclic dialkoxy group, a silane with a silicon atom not bound to a cyclic dialkoxy group and bound to bridging group(s) only, a silane with silicon bound to both one end of a bridging group and both ends of a cyclic dialkoxy group, a silane with a silicon atom not bound at all to a dialkoxy group (as long as at least one other silicon atom in the same molecule is bound to at least one cyclic or bridging group), etc. As used herein, hydrocarbon based diols refer to diols, which contain two OH groups on a hydrocarbon or heterocarbon structure. The term, "hydrocarbon based diol", refers to the fact that the backbone between the two oxygen atoms consists entirely of carbon atoms, carbon-carbon bonds between the carbon atoms, and two carbon-oxygen bonds encompassing the alkoxy ends. The heterocarbons in the structure occur pendent to the carbon backbone.

The structures given by Formula 2 will herein be referred to as the appropriate diol, in a few specific cases, glycol is the more commonly used term, prefixed by the particular hydrocarbon or heterocarbon group associated with the two OH groups. Examples include neopentylglycol, 1,3-butanediol, and 2-methyl-2,4-pentanediol. The groups whose structures are given by Formula 3 will herein be referred to as the appropriate dialkoxy, prefixed by the particular hydrocarbon or heterocarbon group associated with the two OH groups. Thus, for example, the diols, neopentylglycol, 1,3-butanediol, and 2-methyl-2,4-pentanediol correspond herein to the dialkoxy groups, neopentylglycoxy, 1,3-butanedialkoxy, and 2-methyl-2,4-pentanedialkoxy, respectively.

The cyclic and bridging organofunctional silanes used herein, in which the silane is derived from a diol, commonly referred to as a glycol, are correspondingly glycoxysilane. Also, the cyclic and bridging organofunctional dialkoxy silanes used herein, in which the silane is derived from a diol, commonly referred to as a diol, are correspondingly named dialkoxysilane.

As used herein, the notations, (—O—)$_{0.5}$ and [—O(R$^{10}$CR$^{11}$)$_f$O—]$_{0.5}$, refer to one half of a siloxane group, Si—O—Si, and one half of a bridging group, respectively. These notations are used in conjunction with a silicon atom and they are taken herein to mean one half of an oxygen atom, namely, the half bound to the particular silicon atom, or to one half of a dialkoxy group, namely, the half bound to the particular silicon atom, respectively. It is understood that the other half of the oxygen atom or dialkoxy group and its bond to silicon occurs somewhere else in the overall molecular structure being described. Thus, the (—O—)$_{0.5}$ siloxane groups and the [—O(R$^{10}$CR$^{11}$)$_f$O—]$_{0.5}$ dialkoxy groups mediate the chemical bonds that hold two separate silicon atoms together, whether these two silicon atoms occur intermolecularly or intramolecularly. In the case of [—O(R$^{10}$CR$^{11}$)$_f$O—]$_{0.5}$, if the hydrocarbon group, (R$^{10}$CR$^{11}$)$_f$ is unsymmetrical, either end of [—O(R$^{10}$CR$^{11}$)$_f$O—]$_{0.5}$ may be bound to either of the two silicon atoms required to complete the structures given in Formula 1.

As used herein, alkyl includes straight, branched and cyclic alkyl groups; alkenyl includes any straight, branched, or cyclic alkenyl group containing one or more carbon-carbon double bonds, where the point of substitution can be either at a carbon-carbon double bond or elsewhere in the group. Also, alkynyl includes any straight, branched, or cyclic alkynyl group containing one or more carbon-carbon triple bonds and optionally also one or more carbon-carbon double bonds as well, where the point of substitution can be either at a carbon-carbon triple bond, a carbon-carbon double bond, or elsewhere in the group. Specific examples of alkyls include methyl, ethyl, propyl, and isobutyl. Specific examples of alkenes include vinyl, progeny, ally, lethally, ethylidenyl norbornane, ethylidene norbornyl, ethylidenyl norbornene and ethylidene norbornenyl. Specific examples of alkynyls include acetylenyl, propargyl and methylacetylenyl.

As used herein, aryl includes any aromatic hydrocarbon from which one hydrogen atom has been removed; aralkyl includes any of the aforementioned alkyl groups in which one or more hydrogen atoms have been substituted by the same number of like and/or different aryl (as defined herein) substituents; and arenyl includes any of the aforementioned aryl groups in which one or more hydrogen atoms have been substituted by the same number of like and/or different alkyl (as defined herein) substituents. Specific examples of aryls include phenyl and naphthalenyl. Specific examples of aralkyls include benzyl and phenethyl. Specific examples of arenyls include tolyl and xylyl.

As used herein, cyclic alkyl, cyclic alkenyl and cyclic alkynyl also include bicyclic, tricyclic, and higher cyclic structures, as well as the aforementioned cyclic structures further substituted with alkyl, alkenyl and/or alkynyl groups. Representative examples include norbornyl, norbornenyl, ethylnorbornyl, ethylnorbornenyl, ethylcyclohexyl, ethylcyclohexenyl, cyclohexylcyclohexyl, and cyclododecatrienyl.

As used herein, the term, heterocarbon, refers to any hydrocarbon structure in which the carbon-carbon bonding backbone is interrupted by bonding to atoms of nitrogen and/or oxygen; or in which the carbon-carbon bonding backbone is interrupted by bonding to groups of atoms containing nitrogen and/or oxygen, such as cyanurate ($C_3N_3O_3$). Thus, heterocarbons include, but are not limited to branched, straight-chain, cyclic and/or polycyclic aliphatic hydrocarbons, optionally containing ether functionality via oxygen atoms each of which is bound to two separate carbon atoms, tertiary amine functionality via nitrogen atoms each of which is bound to three separate carbon atoms, melamino groups and/or cyanurate groups; aromatic hydrocarbons; and arenes derived by substitution of the aforementioned aromatics with branched or straight chain alkyl, alkenyl, alkynyl, aryl and/or aralkyl groups.

Representative examples of G include —(CH$_2$)$_m$— wherein m is 1 to 12; diethylene cyclohexane; 1,2,4-triethylene cyclohexane; diethylene benzene; phenylene; —(CH$_2$)$_p$— wherein p is 1 to 20, which represent the terminal straight-chain alkyls further substituted terminally at the other end, such as —CH$_2$—, —CH$_2$CH$_2$—, —CH$_2$CH$_2$CH$_2$—, and —CH$_2$CH$_2$CH$_2$CH$_2$CH$_2$CH$_2$CH$_2$CH$_2$—, and their beta-substituted analogs, such as —CH$_2$(CH$_2$)$_q$CH(CH$_3$)—, where q is zero to 17; —CH$_2$CH$_2$C(CH$_3$)$_2$CH$_2$—; the structure derivable from methallyl chloride, —CH$_2$CH(CH$_3$)CH$_2$—; any of the structures derivable from divinylbenzene, such as —CH$_2$CH$_2$(C$_6$H$_4$)CH$_2$CH$_2$— and —CH$_2$CH$_2$(C$_6$H$_4$)CH(CH$_3$)—, where the notation C$_6$H$_4$ denotes a disubstituted benzene ring; any of the structures derivable from dipropenylbenzene, such as —$CH_2CH(CH_3)$ $(C_6H_4)CH(CH_3)$ $CH_2$—, where the notation $C_6H_4$ denotes a disubstituted benzene ring; any of the structures derivable from butadiene, such as —$CH_2CH_2CH_2CH_2$—, —$CH_2CH_2CH(CH_3)$—, and —$CH_2CH(CH_2CH_3)$—; any of the structures derivable from piperylene, such as —$CH_2CH_2CH_2CH(CH_3)$—, —$CH_2CH_2CH(CH_2CH_3)$—, and —$CH_2CH(CH_2CH_2CH_3)$—; any of the structures derivable from isoprene, such as —$CH_2CH(CH_3)CH_2CH_2$—, —$CH_2CH(CH_3)CH(CH_3)$—, —$CH_2C(CH_3)(CH_2CH_3)$—, —$CH_2CH_2CH(CH_3)CH_2$—, —$CH_2CH_2C(CH_3)_2$— and —$CH_2CH[CH(CH_3)_2]$—; any of the isomers of —$CH_2CH_2$-norbornyl-, —$CH_2CH_2$-cyclohexyl-; any of the diradicals obtainable from norbornane, cyclohexane, cyclopentane, tetrahydrodicyclopentadiene, or cyclododecene by loss of two hydrogen atoms; the structures derivable from limonene, —$CH_2CH(4\text{-methyl-1-}C_6H_9—)CH_3$, where the notation $C_6H_9$ denotes isomers of the trisubstituted cyclohexane ring lacking substitution in the 2 position; any of the monovinyl-containing structures derivable from trivinylcyclohexane, such as —$CH_2CH_2(vinylC_6H_9)CH_2CH_2$— and —$CH_2CH_2(vinylC_6H_9)CH(CH_3)$—, where the notation $C_6H_9$ denotes any isomer of the trisubstituted cyclohexane ring; any of the monounsaturated structures derivable from myrcene containing a trisubstituted C=C, such as —$CH_2CH[CH_2CH_2CH=C(CH_3)_2]CH_2CH_2$—, —$CH_2CH[CH_2CH_2CH=C(CH_3)_2]CH(CH_3)$—, —$CH_2C[CH_2CH_2CH=C(CH_3)_2](CH_2CH_3)$—, —$CH_2CH_2CH[CH_2CH_2CH=C(CH_3)_2]CH_2$—, —$CH_2CH_2(C—)(CH_3)[CH_2CH_2CH=C(CH_3)_2]$, and —$CH_2CH[CH(CH_3)[CH_2CH_2CH=C(CH_3)_2]]$—; and any of the monounsaturated structures derivable from myrcene lacking a trisubstituted C=C, such as —$CH_2CH(CH=CH_2)CH_2CH_2CH_2C(CH_3)_2$—, —$CH_2CH(CH=CH_2)CH_2CH_2CH[CH(CH_3)_2]$—, —$CH_2C(=CH—CH_3)CH_2CH_2CH_2C(CH_3)_2$—, —$CH_2C(=CH—CH_3)CH_2CH_2CH[CH(CH_3)_2]$—, —$CH_2CH_2C(=CH_2)CH_2CH_2CH_2C(CH_3)_2$—, —$CH_2CH_2C(=CH_2)CH_2CH_2CH[CH(CH_3)_2]$—, —$CH_2CH=C(CH_3)_2CH_2CH_2CH_2C(CH_3)_2$—, and —$CH_2CH=C(CH_3)_2CH_2CH_2CH[CH(CH_3)_2]$.

Representative examples of R groups are H, branched and straight-chain alkyls of 1 to 20 carbon atoms such as methyl, ethyl, propyl, isopropyl, butyl, octenyl, cyclohexyl, phenyl, benzyl, tolyl, allyl, methoxyethyl, ethoxyethyl dimethylaminoethyl, cyanoethyl, and the like. In another embodiment, representative $R^{10}$ and $R^{11}$ groups are hydrogen, methyl, and ethyl, of which hydrogen and methyl are most preferred. In yet another embodiment, representative $R^1$ and $R^2$ groups can be hydrogen, methyl, ethyl, propyl. In still another embodiment, representative examples of $R^3$, $R^4$, $R^5$, $R^6$, $R^7$, and $R^8$ groups can be $H_2$, $C_1$ to $C_4$ straight chain or branched alkyls such as methyl, ethyl, propyl, isopropyl, butyl, isobutyl, pentyl, hexyl, heptyl, octyl, and aryl such as phenyl, benzyl, etc.

As used herein the polysiloxane diols include alkyl and alkylaryl siloxane diol of general formula —O—$SiMe_2$-O—$(SiMe_2$-O—$)_x$—$(SiMeR^{12}$—O—$)_y$—$(SiR^{12}R^{13}$—O—$)_z$—$SiMe_2$-O— wherein each occurrence of $R^{12}$ and $R^{13}$ is independently methyl, phenyl, vinyl or fluoroalkyl and x, y and z are independently an integer ranging from 1 to 100.

As used herein, the polyether siloxane diols include hydrolyzable polyethersiloxane of general formula —O—$(CH_2CH(CH_3)$—O$)_n$—$(CH_2$—$CH_2$—O$)_y$—$((SiMe_2$-O—$)_z$—$SiMe_2$-$)_t$—O—$(CH_2CH(CH_3)$—O$)_x$—$(CH_2$—$CH_2$—O$)_y$—, a non hydrolyzable polyether siloxane of general formula —O—$((CH_2CH(CH_3)$—O—$)_x$—$(CH_2$—$CH_2$—O—$)_y$-G-$(SiMe_2$-O—$)_z$—$SiMe_2$-G-O—$)_t$—$(CH_2CH(CH_3)$—O—$)_x$—$(CH_2$—$CH_2$—O—$)_y$— or —O—$(CH_2CH(CH_3)$—O—$)_x$—$(CH_2$—$CH_2$—O—$)_y$-G-$(SiMe_2$-O—$)_z$—$SiMe_2$-G-O—$(CH_2CH(CH_3)$—O—$)_x$—$(CH_2$—$CH_2$—O—$)_y$—, wherein G, x, y and z are as defined above and t is an integer ranging from 0 to 50.

Specific examples of X are methoxy, ethoxy, propoxy, isopropoxy, isobutoxy, acetoxy, methoxyethoxy, and oximato, as well as the monovalent alkoxy groups derived from diols, known as "dangling diols", specifically, groups containing an alcohol and an alkoxy, such as —O—$CH_2CH$—OH, such as ethylene glycol, propylene glycol, neopentyl glycol, 1,3-propanediol, 2-methyl-1,3-propanediol, 1,3-butanediol, 2-methyl-2,4-pentanediol, 1,4-butanediol, cyclohexane dimethanol, and pinacol. In another embodiment, specific examples of X are methoxy, acetoxy and ethoxy, as well as the monovalent alkoxy groups derived from the diols, ethylene glycol, propylene glycol, neopentyl glycol, 1,3-propanediol, 2-methyl-1,3-propanediol, 1,3-butanediol, and 2-methyl-2,4-pentanediol. X may also be hydroxyacids such as glycolic acid; ester alcohols such as 2,2,4-Trimethyl-1,3-pentanediol monoisobutyrate, Texanol® available from Eastman Chemicals; and other solvents that are not classified as VOCs per European Union Directive 2004/42/EC are included.

Specific examples of $Z^b$ and $Z^c$ can be the divalent alkoxy groups derived from diols, such as ethylene glycol, propylene glycol, neopentyl glycol, 1,3-propanediol, 2-methyl-1,3-propanediol, 1,3-butanediol, 2-methyl-2,4-pentanediol, 1,4-butanediol, cyclohexane dimethanol, pinacol, polysiloxane diol and polyether siloxane diol. In another embodiment, specific examples of $Z^b$ and $Z^c$ are the divalent alkoxy groups derived from the diols such as ethylene glycol, propylene glycol, neopentyl glycol, 1,3-propanediol, 2-methyl-1,3-propanediol, 1,3-butanediol, and 2-methyl-2,4-pentanediol are preferred. The divalent alkoxy groups derived from the diols, 1,3-propanediol, 2-methyl-1,3-propanediol, 1,3-butanediol, and 2-methyl-2,4-pentanediol. The bridging ($Z^b$) content of the cyclic and bridging organofunctional silane compositions herein must be kept sufficiently low to prevent excessive average molecular weights and crosslinking, which would lead to gelation. $Z^b$ may also be ethylenediamine, 2-aminoethanol, dicarboxylic acids such as adipic acid or malonic acid except succinic, maleic or phthalic acid, an acetylenic glycol including polyalkoxylated variants such as Surfynol® surfactants available from Air Products, or polyvinylalcohol used to make a silane ester. $Z^c$ independently may be a diol-derived alkoxy group, ethylenediamine, 2-aminoethanol, dicarboxylic acids such as adipic acid or malonic acid except succinic, maleic or phthalic acid, an acetylenic glycol including polyalkoxylated variants such as Surfynol® surfactants available from Air Products, or polyvinylalcohol used to make silane esters.

Additional embodiments are wherein v and w in Formulas 1 can be such that the ratio of w/v is between 1 and 9; X is RO—, RC(=O)O—; $Z^b$ and $Z^c$ can be derived from the diols, 1,3-propanediol, 2-methyl-1,3-propanediol, 1,3-butanediol, 2-methyl-2,4-pentanediol; R is alkyls of $C_1$ to $C_4$ and H; and G is a divalent straight chain alkyl of 2 to 18 carbon atoms. Other embodiments include those wherein w/v is between 2 and 8; X is ethoxy or one or more of the dangling diols derived from the diols, 1,3-propanediol, 2-methyl-1,3-propanediol, 1,3-butanediol, and 2-methyl-2,4-pentanediol; and G is a $C_2$-$C_{12}$ straight-chain alkyl derivative. Another embodiment are wherein v in Formula 1 is 0; X is RO—, RC(=O)O—; R is alkyls of $C_1$ to $C_4$ and H; and G is a divalent straight chain alkyl of 2 to 18 carbon atoms.

Representative examples of the cyclic and bridging organofunctional silanes described in the present invention include 2-(2-methyl-2,4 pentanedialkoxyethoxysilyl)-1-propyl amine;
2-(2-methyl-2,4-pentanedialkoxyisopropoxysilyl)-1-propyl mercaptan;
2-(2-methyl-2,4-pentanedialkoxymethylsilyl)-1-propyl chloride;
2-(2-methyl-2,4-pentanedialkoxyphenylsilyl)-1-propyl bromide;
3-(1,3-butanedialkoxyethoxysilyl)-1-propyl iodide;
3-(1,3-butanedialkoxyisopropoxysilyl)-1-propyl chloride;
N-[3-(1,3-propanedialkoxyethoxysilyl)-1-propyl]phenylamine;
N-[3-(1,3-propanedialkoxyisopropoxysilyl)-1-propyl]methylamine;
3-(1,2-propanedialkoxyethoxysilyl)-1-propyl glycidyl ether and
3-(1,2-propanedialkoxyisopropoxysilyl)-1-propyl methacrylate, both derivable from propylene glycol; 3-(1,2-ethanedialkoxyethoxysilyl)-1-propyl acrylate and
3-(1,2-ethanedialkoxyisopropoxysilyl)-1-propyl acetate, both derivable from ethylene glycol; 3-(neopentyl glycoxyethoxysilyl)-1-propyl amine and
3-(neopentyl glycoxyisopropoxysilyl)-1-propyl glycidyl ether, both derivable from neopentyl glycol; 3-(2,3-dimethyl-2,3-butanedialkoxyethoxysilyl)-1-propyl acrylate and
3-(2,3-dimethyl-2,3-butanedialkoxyisopropoxysilyl)-1-propyl methacrylate, both derivable from pinacol; 3-(2,2-diethyl-1,3-propanedialkoxyethoxysilyl)-1-propyl mercaptan; S-[3-(2,2-diethyl-1,propanedialkoxyisopropoxysilyl)-1-propyl]ethylthioether;
bis[3-(2-methyl-1,3-propanedialkoxyethoxysilyl)-1-propyl] disulfide;
bis[3-(2-methyl-1,3-propanedialkoxyisopropoxysilyl)-1-propyl]trisulfide;
bis[3-(1,3-butanedialkoxymethylsilyl)-1-propyl]tetrasulfide;
bis[3-(1,3-propanedialkoxymethylsilyl)-1-propyl]thioether;
3-(1,3-propanedialkoxyphenylsilyl)-1-propyl glycidyl thioether;
tris-N,N',N"-[3-(1,2-propanedialkoxymethylsilyl)-1-propyl] melamine and
tris-N,N',N"-[3-(1,2-propanedialkoxyphenylsilyl)-1-propyl] melamine, both derivable from propylene glycol; 3-(1,2-ethanedialkoxymethylsilyl)-1-propyl chloride and
3-(1,2-ethanedialkoxyphenylsilyl)-1-propyl bromide, both derivable from ethylene glycol; 3-(neopentyl glycoxymethylsilyl)-1-propyl acetate and 3-(neopentyl glycoxyphenylsilyl)-1-propyl octanoate, both derivable from neopentyl glycol;
3-(2,3-dimethyl-2,3-butanedialkoxymethylsilyl)-1-propyl amine and
3-(2,3-dimethyl-2,3-butanedialkoxyphenylsilyl)-1-propyl amine, both derivable from pinacol; 3-(2,2-diethyl-1,3-propanedialkoxymethylsilyl)-1-propyl acrylate;
3-(2,2-diethyl-1,3-propanedialkoxyphenylsilyl)-1-propyl methacrylate;
3-(2-methyl-1,3-propanedialkoxyethylsilyl)-1-propyl glycidyl ether;
3-(2-methyl-1,3-propanedialkoxyphenylsilyl)-1-propyl acetate;
2-(2-methyl-2,4-pentanedialkoxyethoxysilyl)-1-ethyl acrylate;
2-(2-methyl-2,4-pentanedialkoxymethoxysilyl)-1-ethyl bromide;
2-(2-methyl-2,4-pentanedialkoxy methylsilyl)-1-ethyl benzenesulfonate;
2-methyl-2,4-pentanedialkoxyethoxysilylmethyl methacrylate;
2-methyl-2,4-pentanedialkoxyisopropoxysilylmethyl bromide;
neopentylglycoxypropoxysilylmethyl amine; propyleneglycoxymethylsilylmethyl mercaptan; neopentylglycoxyethylsilylmethyl glycidyl ether;
2-(neopentylglycoxyisopropoxysilyl)-1-ethyl butyrate;
2-(neopentylglycoxy methylsilyl)-1-ethyl propionate;
2-(1,3-butanedialkoxymethylsilyl)-1-ethyl acrylate;
3-(1,3-butanedialkoxyisopropoxysilyl)-4-butyl methacrylate;
3-(1,3-butanedialkoxyethylsilyl)-1-propyl mercaptan;
3-(1,3-butanedialkoxymethylsilyl)-1-propyl methanesulfonate;
6-(2-methyl-2,4-pentanedialkoxyethoxysilyl)-1-hexyl amine;
1-(2-methyl-2,4-pentanedialkoxyethoxysilyl)-5-hexyl acrylat;
8-(2-methyl-2,4-pentanedialkoxyethoxysilyl)-1-octyl methacrylate;
10-(2-methyl-2,4-pentanedialkoxyethoxysilyl)-1-decyl glycidyl ether;
3-(2-methyl-2,4-pentanedialkoxyethoxysilyl)-1-propyl trifluoromethanesulfonate;
3-(2-methyl-2,4-pentanedialkoxypropoxysilyl)-1-propyl amine;
N-[3-(2-methyl-2,4-pentanedialkoxyisopropoxysilyl)-1-propyl]ethylene diamine;
tris-N,N',N"-[3-(2-methyl-2,4-pentanedialkoxybutoxysilyl)-1-propyl]diethylene triamine;
tetrakis-N,N',N",N'''-[3-(2-methyl-2,4-pentanedialkoxyisopropoxysilyl)-1-propyl]triethylene tetramine;
bis-(3-(2-methyl-2,4-pentanedialkoxyethoxysilyl)-1-propyl) sulfide;
6-(1,3-butanedialkoxyethoxysilyl)-1-hexyl amine;
1-(1,3-butanedialkoxyethoxysilyl)-5-hexyl glycidyl ether;
8-(1,3-butanedialkoxyethoxysilyl)-1-octyl acrylate;
10-(1,3-butanedialkoxyethoxysilyl)-1-decyl methacrylate;
bis-(3-(2-methyl-2,4-pentanedialkoxyethoxysilyl)-1-propyl) thioether;
ethylenediamine;
2-aminoethanol;
adipic acid;
malonic acid; and
polyvinylalcohol.

In another embodiment, the cyclic dialkoxy organofunctional silanes are cyclic and bridging analogs to the 3-chloro-1-propyltriethoxysilane (3-triethoxysilyl-1-propyl chloride), used as a starting point for the manufacture of silane coupling agents as, for example, polysulfide silanes, such as triethoxysilylpropyl tetrasulfide referred to herein as TESPT, triethoxysilylpropyl disulfide referred to herein as TESPD. The cyclic and bridging haloalkyl silanes are novel and excellent alternatives to 3-triethoxysilyl-1-propyl chloride for use where reduced VOC emissions are desired.

The cyclic and bridging organofunctional silane compositions included herein may comprise single components or various mixtures of individual cyclic and bridging organofunctional silane components, organofunctional silane components, which contain only monofunctional alkoxy groups, and optionally including other species as well. Synthetic methods result in a distribution of various silanes, wherein mixtures of the starting components are employed for the purpose of generating mixtures of cyclic and bridging organofunctional silane products. Moreover, it is understood that the partial hydrolyzates and/or condensates of these cyclic and bridging organofunctional silanes, also referred to as cyclic and bridging organofunctional siloxanes and/or silanols, may be encompassed by the silanes herein as a side product of most methods of manufacture of the cyclic and bridging organofunctional silanes. Also, the partial hydrolyzates and/or condensates can occur upon storage of the cyclic and bridging organofunctional silanes, especially in humid conditions, or under conditions in which residual water remaining from their preparation is not completely removed subsequent to their preparation. Furthermore, partial to substantial hydrolysis of the cyclic and bridging organofunctional silanes may be deliberately prepared by incorporating the appropriate stoichiometry or excess of water into the methods of preparation described herein for the silanes. Also, the siloxane content of the cyclic and bridging organofunctional silanes may be deliberately prepared by incorporating the appropriate stoichiometry or excess of water into the methods of preparation for the silanes described herein. Silane structures herein encompassing hydrolyzates and siloxanes are described in the structures given in Formula 1 wherein the subscripts, v, of $Z^b$=(—O—)$_{0.5}$ and/or u, of X=OH can be substantive, meaning substantially larger than zero.

The cyclic and bridging organofunctional silane compositions, if liquid, may be loaded on a carrier or a mixture of more than one carrier, such as a porous polymer, carbon black, or an inorganic filler, such as silica, alumina, various clays, etc. By loading the composition on a carrier it is in solid form for delivery to the rubber formulation. In another embodiment, the carrier would be part of the filler, either intimately absorbed onto or within, or chemically bound to the filler.

The silane compounds with heterocyclic silicon groups included herein may be prepared by transesterification of organofunctional alkoxy-substituted silanes and diols with or without a catalyst, by the esterification of organofunctional silyl halides with diols, or by the hydrosilylation of substituted alkenes with a hydrosilane containing a heterocylic silicon group to generate cyclic and bridging silane compositions.

The transesterification of organofunctional alkoxy-substituted silanes and diols may be conducted with or without a catalyst. The catalyst may be an acid, a base or a transition metal catalyst. Suitable acid catalysts are hydrochloric acid, p-toluenesulfonic acid and the like. Typical base catalysts are sodium methoxide, sodium ethoxide. Suitable transition metal catalysts are tetraisopropyl titanate, dibutyltin dilaurate.

During esterification of organofunctional silyl halides with diols, diols are added to the silyl halide with removal of the hydrogen halide formed. The hydrogen halide may be removed by sparging with nitrogen or by using reduced pressure. Any remaining halo groups can be removed by the addition of an alcohol such as methanol, ethanol, isopropanol, and the like.

In another embodiment of the present invention, the diol-derived organofunctional silane can be prepared by reacting a catalyzed mixture of organofunctional silane reactant and diol with simultaneous distillation. The reaction leads to the alcohol exchange of one or more of the alkoxy groups selectively at the silicon atom of the organofunctional silane reactant with the diol. The reaction is driven by the removal of the more volatile by-product alcohol by distillation. Suitable catalysts include acids such as p-toluenesulfonic acid, sulfuric acid, hydrochloric acid, chlorosilanes, chloroacetic acids, phosphoric acid, their mixtures, and so forth; bases such as sodium ethoxide; and, transition metal-containing catalysts such as titanium alkoxides, titanium-containing chelates, zirconium alkoxides, zirconium-containing chelates and mixtures thereof.

In yet another embodiment of the present invention, the diol-derived organofunctional silane can be prepared by catalyzing a mixture of organofunctional silane and diol, in a first embodiment, at a molar ratio of at least about 0.5 moles of diol per alkoxy-silyl group to be transesterified, in a second embodiment, at a molar ratio of from about 0.5 to about 1.5 for a trialkoxy silane; and, in a third embodiment, from about 1.0 to about 1.5 for a trialkoxy silane. In each of the foregoing embodiments, the reaction temperature can range from about 10° C. to about 150° C. and in another embodiment from about 30° C. to 90° C. while maintaining a pressure in the range of from about 0.1 to about 2000 mm Hg absolute, and in another embodiment, from about 1 to about 80 mm Hg absolute. Excess diol can be utilized to increase reaction rate.

In another embodiment the diol-derived organofunctional silane can be prepared by slowly adding diol to organofunctional silane in the presence of catalyst at the desired reaction temperature and under vacuum. If desired, a neutralization step may be utilized to neutralize any acid or base catalyst that may have been utilized thereby improving product storage.

Optionally, an inert solvent may be used in the process. The solvent may serve as a diluent, carrier, stabilizer, refluxing aid or heating agent. Generally, any inert solvent, i.e., one which does not enter into the reaction or adversely affect the reaction, may be used. In one embodiment, solvents are those which are liquid under normal conditions and have a boiling point below about 150° C. Examples include aromatics, hydrocarbons, ethers, aprotic solvents and chlorinated hydrocarbon solvents such as, toluene, xylene, hexane, butane, diethyl ether, dimethylformamide, dimethyl sulfoxide, carbon tetrachloride, methylene chloride, and so forth.

In another embodiment of the present invention, the diol-derived organofunctional silane can be prepared by continuously premixing the flow-streams of organofunctional silane reactant, diol, and catalyst (when employed) at appropriate ratios and then introducing the premixed reactants into a reactive distillation system, in one embodiment, a thin film distillation device operating at the desired reaction temperature and vacuum conditions. Conducting the reaction in a thin film under vacuum accelerates the removal of the alcohol by-product and improves the transesterification reaction rate. The vaporization and removal of the by-product alcohol from the film shifts the chemical equilibrium of the reaction to favor formation of the desired product and minimizes undesired side reactions.

The foregoing embodiment of the process herein comprises the steps of:

a) reacting, in a thin film reactor, a thin film reaction medium comprising organofunctional silane, e.g., a thiocarboxylate silane, diol and catalyst to provide diol-derived organofunctional silane and by-product alcohol;

b) vaporizing the by-product alcohol from the thin film to drive the reaction;

c) recovering the diol-derived organofunctional silane reaction product;

d) optionally, recovering the by-product alcohol by condensation; and, e) optionally, neutralizing the diol-derived organofunctional silane product to improve its storage stability.

The molar ratio of diol to organofunctional silane reactant used in the foregoing continuous thin film process will depend upon the number of alkoxy groups that are desired to be replaced with diol. In one embodiment of the thin film process, a stoichiometric equivalent molar ratio of 1 is used wherein one diol replaces two alkoxy groups. Generally, for the practice of this embodiment, the molar ratio of diol to organofunctional silane can be varied within a range of from about 95 to about 125 percent of stoichiometric equivalence for each alkoxy-silyl group to be transesterified. In a particular embodiment, the molar ratio of diol to organofunctional silane can be within the range of from about 100 to about 110 percent of stoichiometric equivalence. In another embodiment, the molar ratio can be within a range of from about 100 to about 105 percent of stoichiometric equivalence for the molar ratio of diol to organofunctional silane. Those skilled in the art will recognize that excess diol could be utilized to increase reaction rates but such is ordinarily of no significant advantage when conducting the reaction in a thin film and only adds to the expense.

The apparatus and method of forming the film are not critical and can be any of those known in the art. Typical known devices include falling film or wiped film evaporators. Minimum film thickness and flow rates will depend on the minimum wetting rate for the film forming surface. Maximum film thickness and flow rates will depend on the flooding point for the film and apparatus. Vaporization of the alcohol from the film is effected by heating the film, by reducing pressure over the film or by a combination of both. It is preferred that mild heating and reduced pressure are utilized to form the diol-derived organofunctional silane of this invention. Optimal temperatures and pressures (vacuum) for running the thin film process will depend upon the specific starting organofunctional silane's alkoxy groups and diol used in the process. Additionally, if an optional inert solvent is used in the process, that choice will affect the optimal temperatures and pressures (vacuum) utilized.

Mixtures of these silanes described above herein can be employed in the practice of this invention so as not to venture from the spirit and scope of the invention. Advantages of the silane of this invention is that they react in a similar fashion to the silane heretofore used in coating compositions but without the production of any significant amount of VOCs. Further, the silane employed in the coating compositions of the invention reduce the need for recovery and remediation equipment and use of special engineering controls to meet new, stricter emission limits as well as mitigate explosion, flammability, and health hazards. Accordingly, use of the silanes of the present invention in manufacturing reduce the cost associated with reducing the presence and emissions of VOCs. For silanes made from hydroxy and/or aminofunctional surfactants or coalescing agents the hydrolysis of the silane during conditions of use releases a compound (other than the silane) that performs a function in the coating system (such as wetting, flow and leveling, and gloss improvement as examples for surfactants and improved film formation (film integrity, scrub resistance) as an example for a coalescing agent in addition to the desired reduction in VOC versus conventional alkoxysilanes. In some cases the diol, dicarboxylic acid, alkanoamine or other compound formed from the hydrolysis of the silane may be captured by reaction with other components of the coating system.

The catalyst can be an ion exchange resin such as Purolite® CT-175 or CT 275 available from Plurolite, Amberlite® IRA 400, 402, 904, 910 or 966 available from Rohm & Haas, Lewatit® M-500, M-504, M-600, M-500-A, M-500 or K-2641, available from Bayer, Dowex® SBR, SBR-P, SAR, MSA-1 or MSA 2, available from Dow, or DIAON® SA10, SA12, SA 20A, PA-302, PA-312, PA-412 or PA-308, available from Mitsubishi. The catalyst can also be an alkylammonium salt such as hexadecyltrimethylammonium chloride, tetra-n-butylammonium chloride, or benzyl trimethyl ammonium chloride or bromide or the hydroxide form of these alkylammonium salts either alone or in combination with the halide salts. Also useful as catalysts are the reaction products of quaternary ammonium organofunctional silanes and supports such as ceramic (inclusive of glass), silica gel, precipitated or fumed silica, alumina, aluminosilicate, etc.

The molar ratio of water to silane(s), in a first embodiment, is from about 0.1 to about 1.5, in second embodiment the molar ratio of water to silane(s) is from about 0.4 to about 1.0, in a third embodiment the molar ratio of water to silane(s) is less than about 0.5.

The epoxy silane monomer can be combined with a polyalkyleneoxide functional silane, the latter improving the water solubility and the stability of the oligomer of the two silanes. Other monomeric silanes, as referenced in U.S. Pat. Nos. 3,337,496, 3,341,469 and 5,073,195 which are incorporated herein by reference, can be added to improve the solubility and stability of epoxy silane oligomers.

Glycidoxy silane can be one or more of gamma-glycidoxypropyl trimethoxysilane, gamma-glycidoxypropyl triethoxysilane, gamma-glycidoxypropyl methyldimethoxysilane, gamma-glycidoxypropyl methyldiethoxysilane and the like.

According to another exemplary embodiment of the present invention, the silane is produced by reacting at least one epoxy silane monomer with a diol or dicarboxylic acid in the presence of another catalyst.

The epoxy silane monomers can be based on glycidoxy epoxy silanes or cycloaliphatic epoxysilanes in combination with other monomeric silanes that can provide specific organofunctional features like vinyl, methacryl, alkyl, polyalkyleneoxide and others with the proviso that they are non-reactive with epoxy functionalities.

The cycloaliphatic expoxy silane can be one or more of beta-(3,4-expoxycyclohexyl)-ethyl trimethoxysilane, beta-(3,4-expoxycyclohexyl)-ethyl methyl dimethoxysilane, beta-(3,4-expoxycyclohexyl)-ethyl methyl diethoxysilane, beta-(3,4-epoxycyclohexyl)-ethyl triethoxysilane and the like.

Suitable catalysts for producing the silane of the present invention include acids, bases or transition metals. For example, catalyst acids such as p-toluenesulfonic acid, sulfuric acid, hydrochloric acid, chlorosilanes, chloroacetic acids, phosphoric acid, their mixtures, and so forth; bases such as sodium methoxide and sodium ethoxide; and, transition metal-containing catalysts such as titanium alkoxides, titanium-containing chelates, zirconium alkoxides, zirconium-containing chelates and mixtures thereof. More particularly, the transition metal catalyst is tetraisopropyl titanate or dibutyltin dilaurate.

According to another embodiment of the present invention, the epoxy silane oligomer (ESO) is synthesized without additional solvent or in the presence of an alcohol-free, chemically stable solvent, e.g., an aliphatic hydrocarbon, a paraffin such as naphtha or mineral spirits, an aromatic hydrocarbon such as toluene, xylene or higher boiling homolog thereof; a ketone such as acetone, methyl ethyl ketone, methyl iso-butyl ketone, amyl ketone, an ester such as ethyl, n-propyl, n-butyl or amyl acetate, and the like.

In another embodiment of the present invention, by-product alcohol is continuously removed during the reaction. Other variations of the method described above can be found in U.S. patent application Ser. No. 11/100,840, filed Apr. 7, 2005, the entire contents of which are incorporated by reference herein for all purposes.

According to another embodiment of the present invention, the ESOs can be used in water borne zinc rich primers or protective coating systems, metallic pigment paste dispersions, a blend of metallic paste dispersion with waterborne latexes or dispersions for primers, coatings or inks, waterborne protective coatings, waterborne shop primers, metallic pigment dispersions and their use in printing ink or coatings, cross linkers of waterborne latexes and dispersions including but not limited to anionic and cationic dispersions, acrylic styrene acrylic, polyurethane and epoxy dispersions, vinyl resins, adhesion promoters for same systems described above, additive or binder systems for dispersion of metallic fillers and pigments, pigment dispersion for inorganic fillers such as calcium carbonate, kaolin, clay, etc., waterborne protective coatings using zinc and other metallic pigments as sacrificial pigment, waterborne decorative paints for metal, plastics and other substrates.

More particularly, a waterborne composition is provided which comprises the low VOC epoxy silane oligomer of the present invention. Alternatively, a waterborne composition is provided which comprises at least one epoxy silane oligomer, wherein the epoxy silane oligomer is produced by the reaction of a silane which, upon hydrolysis, of its hydrolyzable sites, produces a reduced amount of volatile organic compound compared to that produced by the hydrolysis of a silane possessing an equivalent number of hydrolyzable sites all of which are hydrolyzable alkoxy groups with less than 1.5 equivalents of water in the presence of a catalyst, wherein said water is continuously fed during the reaction.

The silanes are the same as those described herein above. Suitable catalysts are the same as those described above. For instance, the catalyst can be an ion exchange resin, a titanate, a Lewis acid, a zirconate, an alkylammonium salt, a quaternary ammonium-functional silane reacted with at least one of ceramic, silica gel, precipitated or fumed silica, alumina or aluminosilicate and any combination thereof.

The waterborne composition can also include one or more ingredients selected from the group consisting of a co-solvent, a surfactant, crosslinker, binder, pH adjusting agent, monomeric silane, and pigment paste dispersion.

Typical co-solvents are ethylene glycol monomethyl ether (EGME), ethylene glycol monoethyl ether (EGEE), ethylene glycol monopropyl ether (EGPE), ethylene glycol monobutyl ether (EGBE), ethylene glycol monomethyl ether acetate (EGMEA), ethylene glycol monohexyl ether (EGHE), ethylene glycol mono-2-ethylhexyl ether (EGEEHE), ethylene glycol monophenyl ether (EGPhE), diethylene glycol monomethyl ether (diEGME), diethylene glycol monoethyl ether (diEGEE), diethylene glycol monopropyl ether (diEGPE), diethylene glycol monobutyl ether (diEGBE), butyl carbitol, dipropylene glycol dimethyl ether (diEGME), butyl glycol, butyldiglycol or ester-based solvents. According to another embodiment, the ester-based solvents include ethylene glycol monobutyl ether acetate (EGEEA), diethylene glycol monoethyl ether acetate (diEGEEA), diethylene glycol monobutyl ether acetate (diEGBEA), n-propyl acetate, n-butyl acetate, isobutyl acetate, methoxypropylacetate, butyl cellosolve acetate, butylcarbitol acetate, propylene glycol n-butyl ether acetate, t-Butyl acetate or an alcohol-based solvent. The co-solvent can be dipropylene glycol methyl ether. Other solvents can include one or more combinations of glycol ether solvents or the like. According to another embodiment, alcohol-based solvent can be n-butanol, n-propanol, isopropanol or ethanol.

According to another embodiment of the present invention, the co-solvent is present in an amount ranging of from about 0.01 to about 60 weight percent of the waterborne composition, or aqueous medium.

Suitable surfactants include alkyl-phenol-ethoxylate surfactants, cationic surfactants, anionic surfactants, non-ionic surfactants, or polyether siloxane based surfactants or any combination thereof. According to an embodiment of the present invention, the surfactant has a hydrophilic-lipophilic balance (HLB) ranging from about 5 to about 13. According to another embodiment of the present invention, the waterborne composition can include two or more surfactants, wherein each of the surfactants independently has an HLB value ranging from about 5 to about 15. In addition, the surfactant can be present in an amount ranging of from about 3 to about 6 weight percent of the waterborne composition, or aqueous medium. Specific examples of the surfactants include ethoxylated alcohols, ethoxylated sorbitan esters, ethoxylated fatty acids, ethoxylated fatty esters, fatty esters, alkylsulfosuccinates, dialkylsulfosuccinates, alkylethersulfates, alkylphosphate esters, sugar lipids, alkyl glucosides, amine ethoxylates, alkylphenol ether sulphates, amide ethoxylates and any combination thereof.

Typical crosslinkers include isocyanates, epoxy curing agents, amino agents, aminoamido agents, epoxy amino adducts, carbodiimides, melamines anhydrides, polycarboxylic anhydrides, carboxylic acid resins, aziridines, titanates, organofunctional titanates, organofunctional silanes, etc.

The binder can be an inorganic and organic binders. The inorganic binder can be a silicate, ethyl silicate, silica nano particles solution or silicone resin.

The organic binder can be vinylic resins, polyvinyl chlorides, vinyl chloride copolymers, vinylacetate copolymers, vinylacetates copolymers, acrylics copolymers, styrene butadiene copolymers, acrylate, acrylate copolymer, polyacrylate, styrene acrylate copolymers, phenolic resins, melamine resins, epoxy resins, polyurethane resins, alkyd resins, polyvinyl butyral resins, polyamides, polyamidoamines resins, polyvinyl ethers, polybutadienes, polyester resins, organosilicone resin, organopolysiloxane resin and any combinations thereof. Natural binders such as cellulosic derivatives like nitrocellulosic resins, carboxymethyl cellulose, cellulose esters of organic acids, cellulose ethers like hydroxymethyl or ethyl cellulose, modified natural rubbers, natural gums or solution forms of said polymers and copolymers.

The organic binders can also be a non-ionic stabilized resins, an anionic stabilized emulsion or a cationic stabilized emulsion.

Further, the organic and inorganic binders can be cured with an external crosslinker(s) such as isocyanates, epoxy curing agents, amino or aminoamido agents, epoxy amino adducts, carbodiimides, melamines anhydrides polycarboxylic anhydrides and carboxylic acid resins, aziridines, titanates, organofunctional titanates, organofunctional silanes such as epoxy silanes, aminosilanes, isocyanatosilanes, methacryl silanes or vinylsilanes.

Suitable pH adjusting agents include boric acid, orthophosphoric acid, acetic acid, ascorbic acid and citric acid. Where a pH modifier, or pH adjusting agent, is used, the pH modifier is generally selected from the oxides and hydroxides of alkali metals, with lithium and sodium as the preferred alkali metals for enhanced coating integrity; or, it is selected from the oxides and hydroxides usually of the metals belonging to the Groups IIA and IIB in the Periodic Table, which compounds are soluble in aqueous solution, such as compounds of strontium, calcium, barium, magnesium, zinc and cadmium. The pH modifier may also be another compound, e.g., a carbonate or nitrate, of the foregoing metals.

Typical monomeric silanes include gamma-glycidoxypropyl trimethoxysilane, gamma-glycidoxypropyl triethoxysilane, gamma-glycidoxypropyl methyldimethoxysilane, gamma-glycidoxypropyl methyldiethoxysilane, vinyltrimethoxysilane, vinyltriethoxysilane, vinyltriisopropoxysilane, vinylmethyldimethoxysilane, gamma-methacryloxypropyl trimethoxysilane, gamma-methacryloxypropyl triethoxysilane, gamma-methacryloxypropyl triisopropoxysilane, octyltriethoxysilane, propyltrimethoxysilane, propyltriethoxysilane, methyltrimethoxysilane, methyltriethoxysilane, polyalkyleneoxidetrimethoxysilane, 3-methacryloxypropyltrimethoxy silane, 3-methacryloxypropyltriethoxy silane and 3-methacryloxypropyltriisopropoxy silane.

Suitable pigment past dispersions include organic pigment dispersions and inorganic pigment dispersions.

According to another exemplary embodiment of the present invention, the low VOC epoxy silane oligomer can be pre-solubilized in an aqueous solution. The aqueous solution may comprise a particulate metal dispersed therein. Further, rather than directly dispersing the epoxy silane oligomer of the present in the waterborne composition, the aqueous solution including the pre-solubilized epoxy silane oligomer may be included in the waterborne composition described above.

The particulate metal may, in general, be any metallic pigment such as finely divided aluminum, manganese, cadmium, nickel, stainless steel, tin, magnesium, zinc, alloys thereof, or ferroalloys. According to another embodiment of the present invention, the particulate metal is zinc dust or zinc flake or aluminum dust or aluminum flake in a powder or paste dispersion form. The particulate metal may be a mixture of any of the foregoing, as well as comprise alloys and intermetallic mixtures thereof. Flake may be blended with pulverulent metal powder, but typically with only minor amounts of powder. The metallic powders typically have particle size such that all particles pass 100 mesh and a major amount pass 325 mesh ("mesh" as used herein is U.S. Standard Sieve Series). The powders are generally spherical as opposed to the leafing characteristic of the flake.

According to another embodiment of the present invention, the metal particulate is a combination of aluminum and zinc. Where the metal particulate is the combination of zinc with aluminum, the aluminum may be present in very minor amount, e.g., from as little as about 2 to about 5 weight percent, of the particulate metal, and still provide a coating of bright appearance. Usually the aluminum will contribute at least about 10 weight percent of the particulate metal. Thus, frequently, the weight ratio of aluminum to zinc in such a combination is at least about 1:9. On the other hand, for economy, the aluminum will advantageously not contribute more than about 50 weight percent of the zinc and aluminum total, so that the aluminum to zinc weight ratio can reach 1:1. The particulate metal content of the coating composition will not exceed more than about 35 weight percent of the total composition weight to maintain best coating appearance, but will usually contribute at least about 10 weight percent to consistently achieve a desirable bright coating appearance. Advantageously, where aluminum is present, and especially where it is present without other particulate metal, the aluminum will provide from about 1.5 to about 35 weight percent of the total composition weight. Typically, when particulate zinc is present in the composition, it will provide from about 10 to about 35 weight percent of the total composition weight. The metal may contribute a minor amount of liquid, e.g., dipropylene glycol or mineral spirits. Particulate metals contributing liquid are usually utilized as pastes, and these pastes can be used directly with other composition ingredients. However, it is to be understood that the particulate metals may also be employed in dry form in the coating composition.

According to another embodiment of the present invention, the metal particulate can be a corrosion protection filler or pigment such as chromate containing anti-corrosive pigments (e.g., zinc chromates and zinc potassium chromates), phosphate containing pigments (e.g., zinc phosphates, alumino triphosphates, calcium magnesium phosphates, barium phosphates, aluminum zinc phosphates, molybdates, wolframates, zirconates and vanadates), metal organic inhibitors like zinc salts of 5-nitrophtalic acid or conductive pigments like iron phosphide.

For the purpose of aiding the dispersion of the particulate metal, a dispersing agent may be added, i.e., surfactant, serving as a "wetting agent" or "wetter", as such terms are used herein. Suitable wetting agents or mixture of wetting agents include nonionic agents such as the nonionic alkylphenol polyethoxy adducts, for example. Also, anionic wetting agents can be employed, and these are most advantageously controlled foam anionic wetting agents. These wetting agents or mixture of wetting agents can include anionic agents such as organic phosphate esters, as well as the diester sulfosuccinates as represented by sodium bistridecyl sulfosuccinate. The amount of such wetting agent is typically present in an amount from about 0.01 to about 3 weight percent of the total coating composition.

In accordance with another exemplary embodiment of the present invention, the low VOC producing epoxy silane oligomers and waterborne composition including the same can be employed in adhesive, sealant or coating compositions.

A coating composition of the present invention can be formulated in a variety of ways. For example, as an alternative to directly using the epoxy silane oligomer (ESO), in accordance with the present invention above, the ESO may be used as a binding agent in a concentrated form or as a more dilute premixture of the ESO, such as the ESO is mixed with a diluent. The diluent may be selected from the substituents providing the coating composition liquid medium, such as water, or water plus boric acid component, or water plus low-boiling organic liquid such as acetone. Additionally, it is contemplated that the ESO binding agent may initially be mixed together with any of the other necessary composition ingredients. Hence, the ESO in a liquid form, such as in a diluent, may be mixed with other coating composition ingredients which are in solid or liquid form. However, it will most always be present in any composition before a particulate metal is added to that composition.

The coating composition can also include what is usually referred to herein as a "boric acid component", or "boron-containing compound". For the "component" or for the "compound", as the terms are used herein, it is convenient to use orthoboric acid, commercially available as "boric acid", although it is also possible to use various products obtained by heating and dehydrating orthoboric acid, such as metaboric acid, tetraboric acid and boron oxide.

The coating composition can also include a thickener. It had previously been considered that thickener was an important ingredient, as discussed in U.S. Pat. No. 5,868,819. It has, however, now been found that serviceable coating compositions can be produced which do not contain a thickener, and desirable coating composition characteristics such as storage stability can nevertheless be achieved. For the present invention, the thickener is thus an optional substituent. The thickener, when present, can contribute an amount of between about 0.01 to about 2.0 weight percent of the total composition weight. This thickener can be a water soluble cellulose ether, including the "Cellosize"™ thickeners.

Suitable thickeners include the ethers of hydroxyethylcellulose, methylcellulose, methylhydroxypropylcellulose, ethylhydroxyethylcellulose, methylethylcellulose or mixtures of these substances. Although the cellulose ether needs to be water soluble to augment thickening of the coating composition, it need not be soluble in the organic liquid. When thickener is present, less than about 0.02 weight percent of the thickener will be insufficient for imparting advantageous composition thickness, while greater than about 2 weight percent of thickener in the composition can lead to elevated viscosities which provide compositions that are difficult to work with. According to an embodiment of the present invention, for thickening without deleterious elevated viscosity, the total composition will contain from about 0.1 to about 1.2 weight percent of thickener. It will be understood that although the use of a cellulosic thickener is contemplated, and thus the thickener may be referred to herein as cellulosic thickener, some to all of the thickener may be another thickener ingredient. Such other thickening agents include xanthan gum, associative thickeners, such as the urethane associative thickeners and urethane-free nonionic associative thickeners, which are typically opaque, high-boiling liquids, e.g., boiling above 100° C. Other suitable thickeners include modified clays such as hectorite clay and organically modified and activated smectite clay. When thickener is used, it is usually the last ingredient added to the formulation.

The coating composition can include further additional ingredients in addition to those already enumerated hereinabove. These other ingredients can include phosphates. It is to be understood that phosphorous-containing substituents, even in slightly soluble or insoluble form, may be present, e.g., as a pigment such as ferrophos. The additional ingredients will frequently be substances that can include inorganic salts, often employed in the metal coating art for imparting some corrosion-resistance or enhancement in corrosion-resistance. Materials include calcium nitrate, dibasic ammonium phosphate, calcium sulfonate, 1-nitropropane lithium carbonate (also useful as a pH modifier), or the like, and, if used, these are most usually employed in the coating composition in a total combined amount of from about 0.1 to about 2 weight percent. Greater than about 2 weight percent of such additional ingredient may be utilized where it is present for a combination of uses, such as lithium carbonate used as a corrosion-inhibitor and also as a pH adjusting agent. Most usually the coating composition is free from these further additional ingredients.

In an other embodiment of the present invention, the formulation may include, when necessary, a surface active agent for reducing foam or aiding in de-aeration. The de-foamer and de-aerator agent may include mineral oil based material, silicone-based material, a polyether siloxane or any combination thereof. The concentration of the surface active agents can be adjusted to in the range from about 0.01% to about 5% of active material. The surface active agents may be used as a pure material or as a dispersion in water or any other appropriate solvent to disperse them into the final waterborne composition.

The coating composition can also contain surface effect agents for modifying a surface of the coating composition such as increased mar resistance, reduced coefficient of friction, flatting effects, improved abrasion resistance. Examples can include silicone polyether copolymers such as e.g., Silwet® L-7608 and other variants available from GE Silicones.

The coating formulation can also contain corrosion inhibitors. Examples of inhibitors include chromate, nitrite and nitrate, phosphate, tungstate and molybdate, or organic inhibitors such as sodium benzoate or ethanolamine.

The waterborne coating can also include an epoxy silane monomer and/or an additional epoxy silane oligomer. The additional epoxy silane monomer may be gamma-glycidoxypropyl trimethoxysilane, gamma-glycidoxypropyl triethoxysilane, gamma-glycidoxypropyl methyldimethoxysilane and a gamma-glycidoxypropyl methyldiethoxysilane. The additional epoxy silane oligomer may be the same as the epoxy silane oligomer or an epoxy silane oligomer formed from a different starting epoxy silane monomer or water to silane ratio.

In addition to an epoxy silane oligomer produced in accordance with the present invention and a monomeric epoxy silane, an epoxy silane monomer and/or a non-epoxy based monomeric silane such as a vinyl silane, an alkyl silane or an alkylene silane can also be included in the coating compositions of the present invention. Typical non-epoxy based monomeric silanes may be vinyltrimethoxysilane (e.g., Silquest® A-171 available from GE Silicones), vinyltriethoxysilane (e.g., Silquest® A-151 available from GE Silicones), vinylmethyldimethoxysilane (e.g., Silquest® A-2171 available from GE Silicones), vinyltriisopropoxysilane (e.g., CoatOSil® 1706 available from GE Silicones), n-octyltriethoxy silane (e.g., Silquest® A-137 available from GE Silicones), propyltriethoxy silane (e.g., Silquest® A-138 available from GE Silicones), propyltrimethoxysilane, methyltrimethoxysilane (e.g., Silquest® A-1630 available from GE Silicones), methyltriethoxysilane (e.g., Silquest® A-162 available from GE Silicones), polyalkyleneoxidetrimethoxysilane (e.g., Silquest® A-1230 available from GE Silicones), 3-methacryloxypropyltrimethoxy silane (e.g., Silquest® A-174 available from GE Silicones), 3-methacryloxypropyltriethoxy silane (e.g., Silquest® Y-9936 available from GE Silicones) or 3-methacryloxypropyltriisopropoxy silane (e.g., CoatOSil® 1757 available from GE Silicones).

According to yet another exemplary embodiment of the present invention, the waterborne and coating composition of the present invention can be applied as a protective layer on a substrate. The protected substrate can be any substrate, e.g., a ceramic or similar substrate, but is most particularly a metal substrate such as a zinc or iron, e.g., steel, substrate, an important consideration being that any such substrate withstand the heat curing conditions for the coating. By a "zinc" substrate it is meant a substrate of zinc or zinc alloy, or a metal such as steel coated with zinc or zinc alloy, as well as a substrate containing zinc in intermetallic mixture. Likewise, the iron of the substrate can be in alloy or intermetallic mixture form. Especially where such are metal substrates, which are most usually ferrous substrates, these may be pretreated, e.g., by chromate or phosphate treatment, prior to application of the undercoating. Thus, the substrate may be pretreated to have, for example, an iron phosphate coating in an amount from about 50 to about 100 mg/ft$^2$ or a zinc phosphate coating in an amount from about 200 to about 2,000 mg/ft$^2$.

For the substrate containing an applied coating composition of the present invention, the subsequent curing of the composition on the substrate will usually be a hot air oven cure, although other curing procedures can be used, e.g., infrared baking and induction curing. The coating composition will be heat-cured at an elevated temperature, e.g., on the order of about 450° F., but usually greater, oven air temperature. The cure will typically provide a substrate temperature, usually as a peak metal temperature, of at least about 450° F. Oven air temperatures may be more elevated, such as on the order of 650° F., but for economy, the substrate temperature need not exceed about 450° F. Curing, such as in a hot air convection oven, can be carried on for several minutes. Although cure times may be less than 5 minutes, they are more typically on the order of from about 10 to about 40 minutes. It is to be understood that cure times and temperatures can be effected where more than one coating is applied or where a subsequently applied, heat-cured topcoating will be used. Thus, shorter time and lower temperature cures can be employed when there will be applied one or more additional coatings or a topcoating that proceeds through an elevated temperature bake at a longer cure time. Also, where more than one coating is applied or a heat-curable topcoating will be applied, the first coating, or undercoating, may only need be dried, as discussed hereinabove. Then, curing can proceed after application of a second coating, or of a heat-cured topcoating.

The resulting weight of the coating on the metal substrate can vary to a considerable degree, but will always be present in an amount supplying greater than 500 mg/ft$^2$ of coating. A lesser amount will not lead to desirably enhanced corrosion-resistance. Advantageously, a coating of greater than about 1,000 mg/ft$^2$ of coated substrate will be present for best corrosion-resistance, while most typically between about 2,000 to 5,000 mg/ft$^2$ of coating will be present. In this coating, there will generally be present from about 400 mg/ft$^2$ to about 4,500 mg/ft$^2$ of particulate metal.

Before use, the coated substrate may be topcoated, e.g., with silica substance. The term "silica substance", as it is used herein for the topcoating, is intended to include both silicates and colloidal silicas. The colloidal silicas include both those that are solvent-based as well as aqueous systems, with the water-based colloidal silicas being most advantageous for economy. As is typical, such colloidal silicas can include additional ingredients, e.g., thickeners as, for example, up to about 5 weight percent of an above-discussed water-soluble cellulose ether. Also, a minor amount, e.g., 20 to 40 percent by weight and usually a lesser amount, of the colloidal silicas can be replaced by colloidal alumina. In general, the use of colloidal silicas will provide for heavier topcoats of silica substance over undercoated substrate materials. It is contemplated to use colloidal silicas containing up to 50 percent by weight solids, but typically, much more concentrated silicas will be diluted, for example, where spray application of the topcoat will be used.

When the topcoating silica substance is silicate, it may be organic or inorganic. The useful organic silicates include the alkyl silicates, e.g., ethyl, propyl, butyl and polyethyl silicates, as well as alkoxyl silicates such as ethylene glycol monoethyl silicate. Most generally for economy, the organic silicate is ethyl silicate. Advantageously, the inorganic silicates are used for best economy and corrosion-resistance performance. These are typically employed as aqueous solutions, but solvent-based dispersions may also be used. When used herein in reference to silicates, the term "solution" is meant to include true solutions and hydrosols. The preferred inorganic silicates are the aqueous silicates that are the water-soluble silicates, including sodium, potassium, lithium and sodium/lithium combinations, as well as other related combinations.

Other ingredients may be present in the silica substance topcoating composition, e.g., wetting agents and colorants. It may also be desirable to prepare a chrome-containing formulation using an ESO of the present invention. Such chrome-containing anti-corrosion pigments are, for example, zinc chromates like zinc potassium chromates and zinc tetrahydroxychromates. Other anti-corrosive pigments can include molybdates, wolframates, zirconates, vanadates, zinc phosphates, chromium phosphates, aluminum triphosphates, barium phosphates, and aluminum zinc phosphates. Such anti-corrosive pigments can also be combined with an organic corrosion inhibitor like zinc salt, e.g., 5-nitrophtalic acid. According to another embodiment of the present invention, the formulations discussed herein using an epoxy silane oligomer of the present invention may be chrome-free.

Substances that may be present can further include thickening and dispersing agents as well as pH adjusting agents, but all such ingredients will typically not aggregate more than about 5 weight percent, and usually less, of the topcoating composition so as to provide for enhanced coating composition stability coupled with augmented coating integrity. The silica substance topcoating may be applied by any of the above described various techniques for use with the coating composition, such as immersion techniques including dip drain and dip spin procedures.

By any coating procedure, the topcoat should be present in an amount above about 50 mg/ft$^2$ of coated substrate. For economy, topcoat weights for cured topcoating will not exceed about 2,000 mg/ft$^2$ of coated substrate. This range is for the cured silica substance topcoating. Preferably, for best coating efficiency and silica substance topcoat economy, the topcoat is an inorganic silicate providing from about 200 to about 800 mg/ft$^2$ of cured silicate topcoating.

Further, the ESOs, in accordance with the present invention discussed above, can be incorporated in many different formulations having many different uses such as those described in U.S. Pat. Nos. 6,270,884 and 6,656,607, the contents of which are incorporated herein by reference in their entirety. For instance, in accordance with an exemplary embodiment of the present invention, a waterborne composition is provided which comprises at least one epoxy silane oligomer made in accordance with present invention describe above herein with one or more optional ingredients selected from the group consisting of a surfactant, pH adjusting agent, co-solvent, monomeric silane, binder, crosslinker and pigment paste dispersion. The epoxy silane oligomer, in a first embodiment, can be present in the range of about 0.05 to about 40 weight percent of the composition, in a second embodiment in the range of about 0.1 to about 20 weight percent of the composition, in a third embodiment in the range of about 0.1 to about 10 weight percent of the composition, in a fourth embodiment in the range of about 0.5 to about 10 weight percent of the composition.

The additives discussed above can be added at any stage of the use of an ESO produced in accordance with the present invention or in any of the different steps of the production of a waterborne composition produced in accordance with the present invention.

The following examples are illustrative of the present invention. It is to be understood that these examples are not intended, nor should they be construed, as being limiting upon the scope of the invention. A person skilled in the applicable arts will appreciate from these examples that this invention can be embodied in many different forms other than as is specifically disclosed.

EXAMPLES 1-6

Synthesis Procedures for the Preparation of Low VOC Epoxy Silane Oligomers

These examples illustrate the preparation of low VOC epoxy silane oligomers. Examples 1 through 6 were prepared using the following procedure. A reactor was charged with an epoxy silane and catalyst and heated to a predetermined temperature. Then, under continuous agitation, a diol was introduced slowly, drop-by-drop, using an introduction funnel. Introduction times were varied from about 1 to about 2 hours. During the synthesis, any solvent generated was collected by vacuum extraction. After complete introduction of the diol and removal of the solvent, the second step of the reaction was initiated by the introduction of an ion exchange resin into the reactor and heating of the reactor to a temperature of about 75° C. Then, distilled water was introduced into the reactor. Different reaction times at atmospheric pressure were applied, e.g., from 5 to 30 minutes. Distillation was performed immediately after the reaction time to remove any solvent generated during synthesis. The pressure during distillation varied from atmospheric pressure down to about 300 mmHg.

More particularly, a 2-liter reactor with mechanical agitation, an introduction funnel and a water condenser was charged with an epoxy silane of the type and quantity listed in Table 1 and a catalyst of the type and quantity listed in Table 1.

Under low agitation, the mixture was then heated to a temperature ranging of from about 45 to about 50° C. The introduction funnel was charged with a diol of the type and quantity listed in Table 1. Next, the diol was introduced drop by drop while stirring with the mechanical agitator for different times (See Table 1). During introduction of the diol, a slight vacuum was maintained to remove any solvent generated during the reaction. The solvent was condensed using liquid nitrogen in the water condenser.

After complete introduction of the diol, the reaction was left for different post reaction times (See Table 1). Once again, any solvent generated during post reaction was removed under vacuum.

After the post reaction time, an ion exchange resin of the type and quantity listed in Table 1 was introduced into the reactor, and the reactor was heated to about 75° C. The introduction funnel was charged with distilled water in the quantity listed in Table 1. Once the reactor reached a minimum pot temperature of 65° C., distilled water was introduced into the reactor in the quantity and times listed in Table 1 while maintaining a reaction temperature of 75° C. After complete introduction of the distilled water, the reaction was allowed to continue for the time period indicated in Table 1. Next, solvent was removed using distillation under vacuum. During solvent removal, the vacuum was increased in a stepwise manner until 300 mmHg was obtained. The reactor was allowed to cool to a temperature of about 30° C. at ambient pressure. Next, the product was extracted and filtered through filter paper followed by a sintered glass filter number 3. The descriptions and amounts of each example are listed in Table 1.

TABLE 1

| Example | | | Example 1 | Example 2 | Example 3 | Example 4 | Example 5 | Example 6 |
|---|---|---|---|---|---|---|---|---|
| Step 1 | Silane | Type | Gamma-glycidoxy-propyl trimethoxy-silane (Silquest ®A-187 available from GE Silicones) | Gamma-glycidoxy-propyl trimethoxy-silane (Silquest ®A-187 available from GE Silicones) | Gamma-glycidoxy-propyl trimethoxy-silane (Silquest ®A-187 available from GE Silicones) | Gamma-glycidoxy-propyl trimethoxy-silane (Silquest ®A-187 available from GE Silicones) | Gamma-glycidoxy-propyl trimethoxy-silane (Silquest ®A-187 available from GE Silicones) | Gamma-glycidoxy-propyl trimethoxy-silane (Silquest ®A-187 available from GE Silicones) |
| | | Weight (grams) | 236.4 | 471.1 | 472.8 | 1418.4 | 246.4 | 225.8 |
| | | Moles | 1.0 | 2.0 | 2.0 | 6.0 | 1.0 | 0.96 |
| | Diol | Type | 2 methyl 1,3 propanediol | Hexylene glycol | 2 methyl 1,3 propanediol | 2 methyl 1,3 propanediol | 2 methyl 1,3 propanediol | Triethylene glycol |
| | | Weight (grams) | 90.1 | 236.3 | 180.2 | 540.6 | 90.1 | 143.4 |
| | | Moles | 1.0 | 2.0 | 2.0 | 6.0 | 1.0 | 0.9 |
| | | Weight (grams) | 0.4 | 0.8 | 8 | 3.4 | 0.6 | 0.7 |
| | Operations (under vacuum in a range of about 100–500 mmHg) | Introduction Time (minutes) | 80 | 70 | 135 | 140 | 60 | 65 |
| | | Post Reaction Time (minutes) | 50 | 60 | 30 | 40 | 65 | 70 |
| | | Total reaction time (minutes) | 130 | 130 | 135 | 180 | 125 | 135 |
| | Diol/Silane Characterization | Mole ratio | 1.00 | 1.00 | 1.00 | 1.00 | 0.96 | .99 |
| | | Residual monomer (Silane percent by GC) | None Detected | None Detected | 3 | None Detected | None Detected | None Detected |
| Step 2 | Ion exchange resin | Type | Amberlite ® IRA 900 CL (available from Rohm & Haas) | Amberlite ® IRA 900 CL (available from Rohm & Haas) | Amberlite ® IRA 900 CL (available from Rohm & Haas) | Amberlite ® IRA 900 CL (available from Rohm & Haas) | Amberlite ® IRA 900 CL (available from Rohm & Haas) | Amberlite ® IRA 900 CL (available from Rohm & Haas) |
| | | Weight (grams) | 6.2 | 18 | 18 | 37.2 | 6.2 | 6.2 |
| | Distilled Water | Weight (grams) | 5.6 | 13.8 | 8.1 | 33.6 | 5.6 | 5.6 |
| | | Moles | 0.3 | 0.8 | 0.5 | 1.9 | 0.3 | 0.3 |
| | Operations | Introduction time (minutes) | 40 | 75 | 70 | 35 | 25 | 1 |
| | | Post reaction time | 30 | 15 | 10 | 5 | 10 | 15 |

TABLE 1-continued

| Example | | Example 1 | Example 2 | Example 3 | Example 4 | Example 5 | Example 6 |
|---|---|---|---|---|---|---|---|
| | Distillation time | 25 | 30 | 60 | 30 | 30 | 30 |
| | Total reaction time | 95 | 120 | 140 | 70 | 65 | 46 |
| Water/Silane Characterization | Mole Ratio | 0.31 | 0.38 | 0.23 | 0.31 | 0.30 | 0.33 |
| | Residual monomer (percent silane-by GC) | 0.04 | 0.04 | 0.2 | 0.05 | 0.05 | n.d. |
| | Epoxy content (mmole/g epoxy) | 3.605 | 3.203 | 3.797 | 3.8 | 3.32 | 2.85 |
| | Free diol content (percent by GC) | 8.4 | Not Determined | Not Determined | Not Determined | Not Determined | Not Determined |
| | Viscosity (mPa.s.) | 898 | 40 | 458 | 298 | 541 | 148 |
| Product recovered | Weight | 233 | 582 | 502 | 1493 | 267 | 304 |

Free monomer measurements were made using gas chromatography on the product resulting from Step 1 (internal cyclization) which indicated very good conversion from monomeric silanes to modified silanes. Indeed, less than 2 to 3 percent of free monomer was detected in any of the Examples 1-6 above. More specifically, Examples 1 through 6 were found to contain an insignificant amount of residual monomer thereby indicating substantially complete conversion of the monomer.

Examples 1 through 6 had viscosities ranging from 40 to 898 mPa·s. The viscosity of the examples varied according to the molecular weight of the corresponding diol and starting monomeric silane.

Epoxy content measured on all products indicated that epoxy rings are still closed and that significant oligomerization took place for all products. The mass balances also indicated that methanol had been released during the reactions and that methanol had been substituted by corresponding diols.

EXAMPLE 7

Solubility of Low VOC Epoxy Silane Oligomer of Example 1

This example illustrates the preparation of a low VOC epoxy silane oligomer of Example 1 in water. Example 7 was prepared by the following method: 20 parts of de-mineralized water and 15 parts of low VOC epoxy silane oligomer of Example 1 were placed in a glass beaker with a magnetic stirrer and mixed for 16 hours until a clear solution was obtained. Analytical characterization of hydrolyzed low VOC epoxy silane oligomer of Example 1 was determined using gas chromatography. The results are listed in Table 2.

TABLE 2

| Results | |
|---|---|
| Free monomer content | None Detected |
| Free methanol content | 4.0% |
| Free diol (hexylene glycol) | 17% |

EXAMPLE 8

Solubility of Low VOC Epoxy Silane Oligomer of Example 2

This example illustrates the solubility of a low VOC epoxy silane oligomer of Example 2. Example 8 was prepared by the following method: 20 parts of de-mineralized water, 15 parts of Low VOC epoxy silane oligomer of Example 2 and a drop of orthophosphoric acid (85%) were placed in a glass beaker with a magnetic stirrer and mixed for 4 hours until a clear solution was obtained. Analytical characterization of hydrolyzed low VOC epoxy silane oligomer of Example 2 was determined using gas chromatography. The results are listed in Table 3.

TABLE 3

| Results | |
|---|---|
| Free monomer content | None Detected |
| Free methanol content | 5.6% |
| Free diol (hexylene glycol) | 21% |

COMPARATIVE EXAMPLE 1

Example 9

The following examples are related to coating formulations including the use of an ESO, in accordance with the present invention, compared with coating formulations including an epoxy silane monomer. The different procedures used to produce the coatings of Comparative Example 1 and Example 9 are described herein below.

Paint Preparation, Application and Testing of Comparative Example 1 and Example 9:

All formulations were mixed and dispersed using a Cowles blade disperser with a blade speed of 10 m/min. Metallic powder dispersion requires high torque and was run on 250 ml batches in order to optimize the quality of dispersion.

Stability of the formulations was rated from the hydrogen evolution resistance of the formulations after appropriate storage times. All products were stored in tightly closed polyethylene (PE) containers. Generation of foam at the top of the formulations, which in most cases leads to "slow expansion" of the containers, was given as a clear sign of hydrogen generation. Viscosity was adjusted to 20-30 DIN cup number 4 with either water when too high, or HEC (Natrosol® solution available from Hercules) when too low.

Preparation of Test Panels:

Metallic test panels, Cold Roll Steel (CRS), were used. The CRS panels were prepared by wiping the surfaces of the panel with acetone and then ethanol. Next, the surfaces were brushed with an abrasive/detergent cleaner. Then, the panels were rinsed under tap water and dried with air dryer before applying the paint. All test panels were used immediately after cleaning.

Paint Application and Baking Conditions:

Paint application was performed using a spray gun in a booth. Paint viscosity was adjusted to about 20 DIN cup number 4 by appropriate dilution with water. One application layer was deposited on a test panel with target deposition of 20-25 gr./sqm of dry paint. Curing of paints was performed by air-drying at 70° C. for 20 minutes in an oven followed by baking in an oven at 300° C. for 30 min.

Testing Procedures:

The following tests were performed on Comparative Example 1 and Example 9: Adhesion test, Cohesion-Metallic Filler Powdering test and Neutral Salt Spray test.

The Adhesion test was made directly on the cured panels according to ISO 2409-1972. The Cohesion-Metallic Filler Powdering test is the evaluation of cohesion of the metallic powders to bind at the surface of the coatings once applied and fully cured. This test reflects the film cohesion and the binding of particles into the film layer. The cohesion-powdering test is carried out by visual evaluation of the quantity of metallic powder removed by a tape adhesive applied on the surface coating according to ISO 2409-1972. After the adhesion test, a visual evaluation of the quantity of metallic powder removed by the tape adhesive applied on the surface coating was made.

High resistance to powdering is noted: Excellent
Medium resistance to powdering is noted: Medium
Low resistance to powdering is noted: Poor The Neutral Salt Spray test, or salt spray test, is an accelerated corrosion test. The purpose of this accelerated corrosion test is to duplicate, in the laboratory, the corrosion performance of a product in the field. The salt spray test has been used extensively in this application for this purpose. The accelerated corrosion test was run according to ISO 7253-1984 with general conditions of the test mentioned here after as follows:

NaCl solution at 50+/−5 g/l
pH of solution between 6.5 to 7.2
Cabinet temperature 35° C.+/−2° C.
Spray rate over a period of 24 h; 1 to 2 ml/h for an 80 sqm surface.
Plates oriented to the top at 20°+/−5°
Red rust is noticed by visual examination.

The corrosion performance was rated according to the number of hours the salt solution described above was sprayed on the surface of a panel until 5% of the surface was covered with red rust. The performance of each of the different coatings was then quoted as the relative hours for 5% red rust coverage related to the amount of coating deposited on the test panel, according to following equation:

NSS–Red Rust 5% (hours/micron)=Red Rust 5% (hours)/Coatings deposit (micron)

The corrosion resistance of protected panels is quite often quoted as hours of protection against corrosion per micron of deposit.

COMPARATIVE EXAMPLE 1

Using a Monomeric Epoxy Silane in a Coating Formulation and Testing the Same

In a metallic beaker equipped with mechanical agitation and a Cowles blade, the following components were placed in the beaker: 13.0 weight percent of a 45 grams/liter solution of boric acid in demineralised water, 4.0 weight percent of dipropylene glycol, 15 weight percent of demineralized water and 9.0 weight percent of gamma-glycidoxypropyl trimethoxysilane. The solution was mixed for 3 hours until a clear solution was obtained.

Then, the following ingredients were added while stirring: 2.2 weight percent of APEO free surfactant (HLB 13-BEROL® 48) and 1.9 weight percent of APEO free surfactant (HLB 9-Lauroxal 3). The components were then mixed together for ten minutes.

Next, the following metallic fillers were added under agitation: 39.0 weight percent of zinc aluminium alloy paste (Stapa® 4 ZnAl 7 90% in mineral spirit available from Eckart) followed by 5.0 weight percent of zinc flake paste (Stapa® DG GTT 90% paste in dipropylene glycol available from Eckart). During introduction of the components, the speed of the agitator was progressively increased to maintain appropriate dispersion torque. Dispersion was maintained for 1 hour at 900 rpm.

The final products were then stored for 2 days before post addition of 2.9 weight percent of additional gamma-glycidoxypropyl trimethoxysilane.

The protective coating was then applied on the CRS test panels as described above. A thin uniform layer of paint was deposited on the test panels using a spray gun. The coating was adjusted to about 10 micron of cured deposit. This adjustment was calculated after the baking of the plates. The test plates were baked according to curing cycle mentioned above. The cured panels were then tested according to the different procedures described above. Results for Comparative Example 1 are discussed below and are listed in Table 4.

The Product was not stable upon storage and hydrogen evolution was observed after only 10 days of storage indicating poor protection of metallic particles.

TABLE 4

| Comparative Example 1 on a CRS test panel after 2 days of aging | |
|---|---|
| Adhesion | 0 - No loss of adhesion |
| Powderin resistance | Excellent |
| NSS Red rust apparition in scratch | 48 hours/micron |
| NSS Red rust 5% on surface | 80 hours/microns |

The corrosion resistance achieved with the monomeric silane, gamma-glycidoxypropyl trimethoxysilane, using the procedures described above provided 800 hours of protection on a CRS test panel for a coating having a thickness of 10 microns deposited on the test panel before more than 5% of the surface of the test panel was covered by red rust. Red rust did not appear in the scratch before 440 hours.

EXAMPLE 9

Using Low VOC Epoxy Silane Oligomer of Example 1 in a Coating Formulation and Testing the Same In a metallic beaker equipped with mechanical agitation and a Cowles blade, the following components were placed into the beaker: 15.0 weight percent of low VOC epoxy silane oligomer of Example 1 and 20 weight percent of a 45 grams/liter solution of boric acid in demineralized water. The solution was mixed for 16 hours until a clear solution was obtained.

Then, the following ingredients were added while stirring: 2.2 weight percent of APEO surfactant (HLB 13-Berol® 48) and 1.9 weight percent of APEO surfactant (HLB 9-Lauroxal 3). The components were mixed together for ten minutes.

Next, the following metallic fillers were added under agitation: 35.0 weight percent of zinc aluminium alloy powder (Stapa® ZnAl 7 powder available from Eckart of Germany) followed by 5.0 weight percent of zinc flake powder in dipropylene glycol paste (Stapa® DG GTT 90% available from Eckart of Germany). During introduction of the metallic fillers, the speed of agitator was progressively increased to maintain an appropriate dispersion torque. Dispersion was maintained for 1 hour at 900 rpm.

Next, 0.4 weight percent of Aerosol® OT 75 was added to the final dispersion and mixed for 10 minutes at 500 rpm. Finally, 12.9 weight percent of water and 5.0 weight percent of a 2 percent HEC solution in water were added into the dispersion and mixed for 10 minutes at 500 rpm. The final dispersion had a viscosity of 20 seconds DIN cup number 4, a pH of 6.7, and a VOC content of less than 6.5 percent of the total formulation, which equates to less than 100 grams/liter of VOC.

The application and testing procedures were the same as those described above in Comparative Example 1. The results are discussed below and are listed in Table 5.

The Product was stable upon storage and hydrogen evolution was not detected during storage thereby indicating excellent protection of metallic particles.

TABLE 5

Results of Example 9 on a CRS test panel after 2 days of aging

| | |
|---|---|
| Adhesion | 0 - No loss of adhesion |
| Powdering resistance | Excellent |
| NSS Red rust apparition in scratch | 52 hours/micron |
| NSS Red Rust 5% on surface | 90 hours/micron |

During testing, it was noted that white rust did not appear until after 552 hours of salt spray exposition, and red rust did not appear on the surface of the panel until after 552 hours of exposition and the scratch was covered by 5% of red rust after 948 hours of exposition.

Thus, Corrosion resistance achieved by the low VOC epoxy silane oligomer of Example 1 without further addition of any co-solvent in a one step process provided about 950 hours of protection on a CRS test panel immediately after 1 day of ageing on the test panel before more than 5 percent of the surface was covered by red rust.

This example demonstrates that low VOC epoxy silane oligomers of the present invention can be used to make very efficient waterborne (WB) protective coatings without addition of a co-solvent at the dispersion stage. The dispersion procedure involves only water and acidic components thus leading to the WB protective coating having a lower VOC content. Also, the level of performance was excellent compared to standard epoxy silane monomers of Comparative Example 1. It is also noticeable that the formulation contained a low amount of methanol. Thus, limiting the amount of VOC contributing to hazardous air pollutants.

EXAMPLES 10-16

Preparation of a Waterborne Shop Primer Using Epoxy Silane Oligomer of Example 4, Application and Testing of Same

EXAMPLE 10

Pre-Solubilization of Example 4

Example 10 illustrates the pre-solubilization of the epoxy silane oligomer of Example 4 in water in combination with a boric acid solution. The pre-solubilized epoxy silane oligomer is to be used later in the direct dispersion of zinc dust without any additional co-solvent. Example 10 was prepared by the following method. The following ingredients were added under continuous agitation in a metallic beaker equipped with mechanical agitation and a Cowles blade: 3.9 weight percent of the epoxy silane oligomer of Example 4 and 2.6 weight percent of a 45 grams/liter solution of boric acid in water. The solution was mixed for about 18 hours until a clear solution was obtained.

Then, under continuous agitation, 6.2 weight percent of demineralised water and 0.29 weight percent of a 1 percent orthophosphoric acid solution in demineralised water were added to the clear solution. The solution was mixed for 18 hours until a clear solution was once again obtained.

EXAMPLE 11

Dispersion of Metallic Powder into the Solution of Example 10

Example 11 illustrates the dispersion of metallic powder into a solution including a pre-solubilized epoxy silane oligomer of the present invention (Example 10). Example 11 was prepared by the following method: under continuous agitation, 0.48 weight percent of APEO free surfactant (HLB 13-Berol® 48), 0.39 weight percent of APEO free surfactant (HLB 9-Lauroxal 3) and 0.2 weight percent of siloxane antifoam (Y-15702 available from GE Silicones) were added to the solution obtained in Example 10 and mixed for about 10 minutes. After mixing, the following metallic filler was added under continuous agitation: 78.0 weight percent of zinc dust (DP 16 zinc dust particles available from Umicore). During introduction of the metallic filler, the speed of the agitator was progressively increased to maintain appropriate dispersion torque. Dispersion was maintained for 1 hour at 1000 rpm.

Next, 7.0 weight percent of an epoxy dispersion (New Gen DPW 6870 available from Hexxion) and 0.84 weight percent of water were added to the dispersion and stirred for 10 minutes at 500 rpm. Finally, 0.01 weight percent of Aerosil® R 972 (available from Degussa Huls) was added into the dispersion and agitated for 10 minutes at 500 rpm. The final dispersion had a viscosity of 90 seconds DIN cup number 4 and pH of 6.7. This dispersion is to be used later on as part A of a two pack (A+B) epoxy dispersion of a waterborne shop primer.

The dispersion part A, Example 11, was kept at room temperature for more than 6 months without any signs of hydrogen degassing or strong settlement issues.

EXAMPLE 12

Preparation of a 2-pack Waterborne Shop Primer A+B

Example 12 describes the preparation of a 2-pack waterborne shop primer using the dispersion of Example 11 (designated as Part A). Example 12 was prepared by the following method. Parts A and B, described and in the amounts listed in Table 6, were mixed together in a metallic beaker under mild agitation for 20 minutes at 500 rpm. The mixture was then adjusted to 18 seconds DIN cup number 4 with demineralized water. There was a significant increase in viscosity of the waterborne shop primer after 16 hours.

TABLE 6

| Ingredients | Amount |
| --- | --- |
| Part A | |
| Example 11 | 100 Parts |
| Part B | |
| New Gen DPW 6870 (amine catalysts available from Hexxion) | 3.5 parts |
| Accelerator Epikure 3253 (available from Hexxion) | 0.13 parts |

EXAMPLES 13-16

Application of Waterborne Shop Primer of Example 12 on CRS Panels

Examples 13-16 illustrate the application of the waterborne shop primer of Example 12 on CRS panels and curing the panels under different curing conditions. Examples 13-14 were prepared by spraying a uniform layer, having a thickness of from about 16 to about 17 microns, of the waterborne shop primer of Example 12 on CRS panels and curing the panels at ambient temperature for 24 hours. Examples 15-16 were prepared by spraying a uniform layer, having a thickness of about 24 to about 26 microns, of the waterborne shop primer of Example 12 on CRS panels and curing the panels by air-drying at 70° C. in an oven for 5 minutes and then removing the panels from the oven and completing the cure at ambient temperature for 24 hours. The physical characteristics and curing conditions of Examples 13-16 are outlined in Table 7.

TABLE 7

Physical Characteristics and Curing Conditions of Examples 13–16

| | Example 13 | Example 14 | Example 15 | Example 16 |
| --- | --- | --- | --- | --- |
| Deposition (grams/sqm) | 13 | 15.0 | 11.1 | 11.5 |
| Thickness (microns) | 16 | 17.1 | 24.5 | 26 |
| Curing Conditions | Ambient | Ambient | Air-Dried at 70° C. for 5 minutes and then ambient | Air-Dried at 70° C. for 5 minutes and then ambient |

Once cured, the panels of Examples 13-16 were tested for the following characteristics: Dust free, ash placed on panels showed no adhesion; Tack free, time for no mark during handling; Dry through, time for coating to resistance scratch and rub; Adhesion, cross cut adhesion test; Impact resistance, reverse impact—falling ball 2 kg-100 cm; Water resistance (drain), time for resistance to drain water; Water resistance (immersion), time for resistance to immersion in water for 24 hours; and MEK rub resistance. The results of the foregoing test of Examples 13-16 are illustrated in Table 8.

TABLE 8

Test Results

| | | Example 13 | Example 14 | Example 15 | Example 16 |
| --- | --- | --- | --- | --- | --- |
| Coating Tests | Dust Free (Minutes) | 10 | 10 | 10 | 10 |
| | Tack Free (Minutes) | 90 | 90 | 35 | 35 |
| | Dry through (70° C. - 5 minutes) | 30 | 30 | 40 | 40 |
| | MEK rub resistance | >30 | >30 | >50 | >50 |
| | Adhesion on CRS panel | 5A | 5A | 5A | 5A |
| | Water resistance Drain (Hours) | 1 | 1 | 1 | 1 |
| | Water Resistance Immersion (Hours) | 20 | 20 | 12 | 12 |
| | Impact Resistance Reverse | 2 Kg-50 cm | 2 Kg-50 cm | 2 Kg-100 cm | 2 Kg-100 cm |

Results show that the waterborne shop primer described above dries quickly and provides good adhesion on metal. Results also show that the waterborne shop primer described above is a fast drying coating with good adhesion on metal. Water resistances reached good levels after very short drying times at room temperature. Adhesion and mechanical resistance tests show that the waterborne shop primer exhibited easy and fast mechanical handling without degradation of coatings. The shelf stability of the part A of the waterborne shop primer was excellent and exceeded 4 months.

In general, the epoxy silane oligomers of the present invention show equivalent or improved performance and offer a significant benefit per the reduction in the amount of volatile organic compounds that are released.

While the invention has been described with reference to a number of exemplary embodiments, it will be understood by those skilled in the art that various changes can be made and equivalents can be substituted for elements thereof without departing from the scope of the invention. In addition, many modifications can be made to adapt a particular situation or material to the teachings of the invention without departing from essential scope thereof. Therefore, it is intended that the invention not be limited to any particular exemplary embodiment disclosed herein.

What is claimed is:

1. A process for producing an epoxy silane oligomer which comprises reacting an epoxy silane with water in a molar ratio of water to epoxy silane of from 0.1 to 1.5, wherein the epoxy silane is produced by reacting at least one epoxy alkoxy-substituted silane monomer and, optionally, a copolymerizable alkoxy-substituted silane other than glycidoxy and cycloaliphatic epoxy silane having two or three alkoxy groups, with a diol or dicarboxylic acid.

2. The process of claim 1 wherein the epoxy alkoxy-substituted silane monomer is a glycidoxy and/or cycloaliphatic epoxy silane having two or three alkoxy groups.

3. The process of claim 2 wherein the glycidoxy silane is at least one member selected from the group consisting of gamma-glycidoxypropyl trimethoxysilane, gamma-glycidoxypropyl triethoxysilane and gamma-glycidoxypropyl methyldiethoxysilane; the cycloaliphatic epoxy expoxy silane is at least one member selected from the group consisting of beta-(3,4-expoxycyclohexyl)-ethyl trimethoxysilane and beta-(3,4-epoxycyclohexyl)-ethyl triethoxysilane; and, optionally copolymerizable alkoxy-substituted silane other than glycidoxy and cycloaliphatic epoxy silane having two or three alkoxy groups is at least one member selected from the group consisting of vinyl trimethoxysilane, vinyl triethoxysilane, vinyl methyl dimethoxysilane, vinyl tri isopropoxysilane, octyl triethoxysilane, propyl triethoxysilane, propyl trimethoxysilane, methyl trimethoxysilane, methyl triethoxysilane, polyalkyleneoxidetrimethoxy silane, methacryl trimethoxysilane, 3-methacryloxypropyl triethoxysilane and 3-methacryloxyproyl-triisopropoxysilane.

4. The process of claim 1 wherein the production of the epoxy silane is carried out in the presence of a catalyst and, optionally, a solvent.

5. The process of claim 4 wherein the catalyst is selected from the group consisting of p-toluenesulfonic acid, sulfuric acid, hydrochloric acid, chlorosilanes, chloroacetic acids, phosphoric acid, sodium methoxide, sodium ethoxide, titanium alkoxides, titanium-containing chelates, zirconium alkoxides, zirconium-containing chelates and any combination thereof.

6. The process of claim 4 wherein the solvent is an alcohol-free solvent, wherein the alcohol-free solvent is at least one member selected from the group consisting of acetone, toluene, aliphatic hydrocarbon, paraffin, aromatic hydrocarbon, ketone and ester.

7. The process of claim 1 which further comprises continuously removing by-product alcohol produced during the reaction.

8. The process of claim 1 wherein the epoxy alkoxy-substituted silane monomer is combined with a monomeric alkoxy-substituted silane with the proviso that the monomeric alkoxy-substituted silane is non-reactive with the epoxy functionality of the epoxy silane monomer.

9. The process of claim 8 wherein the monomeric alkoxy-substituted silane is at least one member selected from the group consisting of vinyltrimethoxysilane, vinyltriethoxysilane, vinyltriisopropoxysilane, vinylmethyldimethoxysilane, octyltriethoxysilane, propyltrimethoxysilane, propyltriethoxysilane, methyltrimethoxysilane, methyltriethoxysilane, polyalkyleneoxidetrimethoxysilane, 3-methacryloxypropyltrimethoxy silane, 3-methacryloxypropyltriethoxy silane and 3-methacryloxypropyltriisopropoxy silane.

10. The process of claim 1 wherein the carboxylic acid is selected from the group consisting of adipic acid and malonic acid.

11. A coating, adhesive or sealant composition containing the epoxy silane oligomer of claim 1.

12. A coating composition containing the epoxy silane oligomer of claim 1 as a coupling agent, crosslinker or adhesion promoter.

13. A waterborne composition which comprises:
i) at least one epoxy silane oligomer, wherein the epoxy silane oligomer is produced by the hydrolysis of at least one epoxy alkoxy substituted silane monomer with a diol or a dicarboxylic acid, the epoxy silane upon hydrolysis of its hydrolyzable sites producing are reduced amount of volatile organic compound compared to that produced by the hydrolysis of a silane possessing an equivalent number of hydrolyzable sites all of which are hydrolyzable alkoxy groups, the hydrolyzing of the epoxy silane being carried out with less than 1.5 equivalents of water, said water being continuously fed during the hydrolysis reaction; and,
ii) one or more optional ingredients selected from the group consisting of a copolymerizable alkoxy-substituted silane other than glycidoxy and cycloaliphatic epoxy silane having two or three alkoxy groups, a surfactant, pH adjusting agent, co-solvent, monomeric silane, binder, crosslinker and pigment paste dispersion.

14. The waterborne composition of claim 13 wherein the epoxy silane has the general formula:

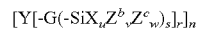   (Formula 1)

wherein each occurrence of G is independently chosen from a set of groups comprising a polyvalent group derived by substitution of one or more hydrogen atoms of an alkyl, alkenyl, aryl or aralkyl group, or a molecular component which can be obtained by removal of one or more hydrogen atoms of a heterocarbon, with G containing from about 1 to about 30 carbon atoms; each occurrence of X is independently selected from the group consisting of —Cl, —Br, $R^1O$—, $R^1C(=O)O$—, hydroxycarboxylic acids, $R^1R^2C=NO$—, $R^1R^2NO$— or $R^1R^2N$—, —$R^1$, —$(OSiR^1R^2)_f(OSi\ R^1R^2R^3)$, and —$O(R^{10}CR^{11})_fOH$, wherein each occurrence of $R^1$, $R^2$, $R^3$, $R^{10}$ and $R^{11}$ is independently R; each occurrence of $Z^b$ is independently selected from the group consisting of $(—O—)_{0.5}$, $[—O(R^{10}CR^{11})_fO—]_{0.5}$, $[—NR^4-L^1—NR^5]_{0.5}$, $[—OC(=O)R^{10}CR^{11}C(=O)O—]_{0.5}$ except succinic, maleic or phthalic acid, an alkanolamine, an acetylenic glycol, a polysiloxane diol, a polyether siloxane diol and a polyhydroxy compound, wherein each occurrence of $R^{10}$ and $R^{11}$ is independently R and each occurrence of $L^1$ is independently G; each occurrence of $Z^c$ is independently selected from the group consisting of —$O(R^{10}CR^{11})_fO$—, —$NR^4-L^1—NR^5$—, —$OC(=O)R^{10}CR^{11}C(=O)O$— except succinic, maleic or phthalic acid, an alkanolamine, an acetylenic glycol, a polysiloxane diol, a polyether siloxane diol and a polyhydroxy compound, wherein each occurrence of $R^{10}$ and $R^{11}$ is independently R and each occurrence of $L^1$ is independently G; each occurrence of R is chosen independently from the set of groups comprising hydrogen, straight alkyl, cyclic alkyl, branched alkyl, alkenyl, aryl, aralkyl, an ether, a polyether and molecular components obtained by removal of one or more hydrogen atoms of a heterocarbon; each occurrence of R containing 1 to about 20 carbon atoms; each occurrence of the subscript f is an integer from 1 to about 15; each occurrence of n is an integer from 1 to about 100, with the proviso that when n is greater than 1; v is a greater than 0 and all the valences for $Z^b$ have a silicon atom bonded to them; each occurrence of the subscript u is an integer from 0 to about 3; each occurrence of the subscript v is an integer from 0 to about 3; each occurrence of the subscript w is an integer from 0 to about 1, with the proviso that u+v+2w=3; each occurrence of the subscript r is an integer from 1 to about 6; each occurrence of the subscript t is an integer from 0 to about 50; each occurrence of the subscript s is an integer from 1 to about 6; each occurrence of Y includes an organofunctional group of valence r and at least one epoxy functional group; and at least one cyclic and bridging organofunctional silane comprising the cyclic and bridging organofunctional silane composition containing at least one occurrence of $Z^b$ or $Z^c$.

15. The waterborne composition of claim 14 wherein the organofunctional group is selected from the group consisting of a univalent organofunctional group, a divalent organofunctional group, a trivalent organofunctional group, a tetravalent organofunctional group and a polyvalent organofunctional group.

16. The waterborne composition of claim 15 wherein the univalent organofunctional group is selected from the group consisting of $CH_2$=CH—, CHR=CH—, $CR_2CH$—, mercapto, acryloxy, methacryloxy, acetoxy, —O—$CH_2$—$C_2H_3O$, —$CH_2$-$CH_2$—$C_6H_9O$, —$C_6H_9O$, —$CR^6$(—O—)$CR^4R^5$, —OH, —$NR^4C$(=O) $OR^5$, —OC(=O)$NR^4R^5$, —$NR^4C$(=O)$SR^5$, —SC(=O)$NR^4R^5$, —$NR^4C$(=S)$OR^5$, —OC(=S)$NR^4R^5$, —$NR^4C$(=S)$SR^5$, —SC(=S)$NR^4R^5$, maleimide, maleate, substituted maleate, fumarate, substituted fumarate, —CN, citraconimide, —OCN, —N=C=O, —SCN, —N=C=S, —$OR^4$, —F, —Cl, —Br; —I, —$SR^4$, —S—$SR^4$, —S—S—$SR^4$, —S—S—S—$SR^4$, —S—S—S—$SR^4$, —$S_xR^4$, —SC(=S)$OR^4$, —SC(=S)$SR^4$, —SC(=O)$SR^4$, —$^{NR4}C$(=O)$NR^5R^6$, —$NR^4C$(=S)$NR^5R^6$, $R^4C$(=O)$NR^5$—, —C(=O)$NR^4R^5$—, $R^4C$(=S)$NR^4$—, melamine, cyanurato, —$NH_2$, —$NHR^4$, —$NR^4R^5$, —$NR^4$-$L^1$-$NR^5R^6$, —$NR^4$—$L^1$(—$NR^5R^6$)$_2$, —$NR^4$-$L^1$-$NR^5$-$L^2$—$NR^6R^7$, —$NR^4$-$L^1$(—$NR^5R^6$)$_3$, —$NR^4$-$L^1$—$NR^5$-$L^2$-$NR^6$-$L^3$—$NR^7R^8$ and —$NR^4$-$L^1$—N(-$L^2NR^5R^6$)$_2$;

the divalent organofunctional group is selected from the group consisting of —(—)C (—O—)$CR^4R^5$, —$CR^5$(—O—)$CR^4$—, —(-)CCH$_2$ (—O—)$CR^4$ $R^5$—, -(-)C $R^5CH_2$ (—O—)$CR^4$—, —O($R^{10}CR^{11}$)$_x$O—, -(-)NC(=O)$OR^5$, —OC(=O )$NR^4$—, -(-) NC(=O)$SR^5$, —SC(=O)$NR^4$—, -(-)NC(=S)$OR^5$, —OC(=S)$NR^4$—, -(-) NC(=S)$SR^5$, —SC(=S)$NR^4$—, —O—, maleate, substituted maleate, fumarate, substituted fumarate, —S—, —S—S—, —S—S—S—, —S—S—S—S—, —S—S—S—S—S—, —$S_x$—, —SC(=S)O—, —SC(=S)S—, —SC(=O)S—, -(-) NC(=O)$NR^4R^5$, —$NR^4C$(=O)$NR^5$—, -(-) NC(=S)$NR^4R^5$, —$NR^4C$(=S)$NR^5$—, $R^4C$(=O)N(-) —, —C(=O)$NR^4$—, $R^4C$(=S)N(-)-, divalent melamine, divalent cyanurato, —NH—, —$NR_4$—, -(-)N-$L^1$—$NR^4R^5$, —$NR^4$-$L^1$—$NR^5$—, (-) $NR^4$)$_2$-$L^1$—$NR^5R^6$, -(-)N-$L^1$—$NR^5$-$L^2$—$NR^6R^7$, —$NR^4$-(-)N-$L^1$—($NR^5R^6$)$_3$, (—$NR^4$)$_2$-$L^1$—($NR^5R^6$)$_2$, -$L^1$—$NR^4$-$L^2$-$NR^5$-$L^3$-$NR^6R^7$, —$NR^4$-$L^1$-N(-)—$L^2$—$NR^5$-$L^3$—$NR^6R^7$, —$NR^4$-$L^1$-$NR^5$-$L^2$-N(-)-$L^3$-$NR^6R^7$, —$NR^4$-$L^1$-$NR^5$-$L^2$-$NR^6$-$L^3$-$NR^7$—, -(-)N-$L^1$-N (-$L^2NR^5R^6$)$_2$ and (—N $R^4L^1$-)$_2$N-$L^2NR^5R^6$;

the trivalent organofunctional group is selected from the group consisting of -(-)C (—O—)$CR^4$—, -(-)CCH$_2$ (—O—)$CR^4$ $R^5$—, -(-)C $R^5CH_2$ (—O—)$CR^4$ —,(-) NC(=O)O—, -(-) NC(=O)S—, -(-)NC(=S)O—, -(-) NC(=S)S—, -(-) NC(=O)$NR^4$—, -(—)NC(=S) $NR^4$—, —C(=O)N(-)-, —C(=S)N(-)-, trivalent melamino; trivalent cyanurato, —N(-)-, -(-)N-$L^1$-$NR^4$-, (—$NR^4$)$_3$-$L^1$, (—$NR^4$)$_2$-$L^1$-$NR^5$-, -(-)N-$L^1$-N(-)-$L^2$-$NR^3R^4$, —$NR^4$-$L^1$ -N(-)-$L^2$-$NR^5$—, -(-)N-$L^1$-$NR^4$-$L^2$-$NR^5$—, -(-)N-$L^1$-N(-)-$L^2$-$NR^5$-$L^3$-$NR^3R^4$, —$NR^4$-$L^1$-N (-)-$L^2$-N(-)-$L^3$-$NR^3R^4$, -(-)N-$L^1$-$NR^5$-$L^2$-N(-)-$L^3$-$NR^3R^4$, —$NR^4$-$L^1$-N(-)-$L^2$-$NR^3$-$L^3$-$NR^4$-, -(-)N-$L^1$-N(-$L^2NR^3R^4$)(-$L^2NR^5$-) and (—$NR^4L^1$-)$_3$N;

the tetravalent organofunctional group is selected from the group consisting of -(-)C (—O—)C(-)-, -(-)NC(=O)N (-)-, -(-)NC(=S )N(-)-, tetravalent melamino, -(-)N-$L^1$-N(-)-, (—$NR^4$)$_4$-$L^1$, (—$NR^4$)$_2$-$L^1$-N(-)-, —(-)N-$L^1$-N(-)-$L^2$-$NR^3$-, -(-)N-$L^1$-$NR^4$-$L^2$(-)-, -(-)N-$L^1$-N(-)-$L^2$-N (-)-$L^3$—$NR^4R^3$, —$NR^4$-$L^1$-N(-)-$L^2$-N(-)-$L^3$-$NR^3$-, -(-) N-$L^1$-$NR^4$-$L^2$-$NR^3$-$L^3$-N(-)- and -(-)N-$L^1$-N (-$L^2$ $NR^3$-)$_2$; and, the polyvalent organofunctional group is selected from the group consisting of polyvalent hydrocarbon groups, (—N $R^3$)(—N—)$_2C_3N_3$, (—N—)$_3C_3N_3$, -(-)N-$L^1$-N (-)-$L^2$-N(-)—, -(-)N-$L^1$-N(-)-$L^2$-N(-)-$L^3$-$NR^3$—, -(-)N-$L^1$-$NR^3$-$L^2$-N(-)-$L^3$-N(-)-, [-(-)N-$L^1$-]$_2$N-$L^2NR^3$—, -(-) N-$L^1$-N(-)-$L^2$-N(-)-$L^3$-N(-)- and [-(-)N-$L^1$-]$_3$, wherein each occurrence of $L^1$, $L^2$, and $L^3$ is selected independently from the set of structures given above for G, each occurrence of R is independently given by one of the structures listed above for R and $R^{1-11}$ and x is independently an integer from 1 to 10.

17. The waterborne composition of claim 14 wherein G is selected from the group consisting of a monovalent hydrocarbon group, $CH_3(CH_2)_p$— wherein p is 1 to 20, diethylene cyclohexane, 1,2,4-triethylene cyclohexane, diethylene benzene, phenylene, —$(CH_2)_m$-wherein m is 1 to 12 and $CH_2$ $(CH_2)_q CH(CH_3)$— wherein q is zero to 17.

18. The waterborne composition of claim 14 wherein R and $R^{1-11}$ are independently selected from the group consisting of methyl, ethyl, propyl, isopropyl, octenyl, cyclohexyl, butyl, phenyl, benzyl, tolyl, allyl, methoxyethyl, ethoxyethyl, dimethylaminoethyl and cyanoethyl.

19. The waterborne composition of claim 14 wherein $R^{10}$ and $R^{11}$ are each independently selected from a group consisting of hydrogen, methyl and ethyl.

20. The waterborne composition of claim 14 wherein $R^1$ and $R^2$ are independently selected from the group consisting of hydrogen, methyl, ethyl and propyl.

21. The waterborne composition of claim 14 wherein $R^3$, $R^4$, $R^5$, $R^6$, $R^7$ and $R^8$ are independently selected from the group consisting of phenyl, methyl, butyl, H and ethyl.

22. The waterborne composition of claim 14 wherein X is selected from the group consisting of methoxy, ethoxy, isobutoxy, propoxy, isopropoxy, acetoxy, methoxyethoxy, oximato and monovalent alkoxy groups derived from diols.

23. The waterborne composition of claim 13 wherein the hydrolysis reaction is carried out in the presence of a catalyst.

24. The waterborne composition of claim 23 wherein the catalyst is at least one member selected from the group consisting of ion exchange resin, titanate, Lewis acid, zirconate, alkylammonium salt and a quaternary ammonium-functional silane reacted with at least one of ceramic, silica gel, precipitated or fumed silica, alumina or aluminosilicate.

25. The waterborne composition of claim 13 wherein the at least one epoxy silane oligomer is pre-solubilized in an aqueous solution.

26. The waterborne composition of claim 13 wherein optional pH adjusting agent is at least one member selected from the group consisting of boric acid, orthophosporic acid, acetic acid, ascorbic acid and citric acid; optional co-solvent is at least one member of the group consisting of dipropylene glycol methyl ether, ethylene glycol monomethyl ether, ethylene glycol monoethyl ether, ethylene glycol monopropyl ether, ethylene glycol monobutyl ether, ethylene glycol monomethyl ether acetate, ethylene glycol monohexyl ether, ethylene glycol mono-2-ethylhexyl ether, ethylene glycol monophenyl ether, diethylene glycol monomethyl ether, diethylene glycol monoethyl ether, diethylene glycol monopropyl ether, diethylene glycol monobutyl ether, butyl carbitol, dipropylene glycol dimethyl ether, butyl glycol, butyldiglycol, ethylene glycol monobutyl ether acetate, diethylene glyco, monoethyl ether acetate, diethylene glycol monobutyl ether acetate, n-propyl acetate, n-butyl acetate, isobutyl acetate, methoxypropylacetate, butyl cellosolve acetate, butylcarbitol acetate, propylene glycol n-butyl ether acetate, t-Butyl acetate, n-butanol, n-propanol, isopropanol and ethanol; and, optional silane monomer is at least one member selected from the group consisting of gamma-glycidoxypropyl trimethoxysilane, gamma-glycidoxypropyl triethoxysilane, gamma-glycidoxypropyl methyldimethoxysilane, gamma-glycidoxypropyl methyldiethoxysilane, vinyltrimethoxysilane, vinyltriethoxysilane, vinyltriisopropoxysilane, vinylmethyldimethoxysilane, gamma-methacryloxypropyl trimethoxysilane, gamma-methacryloxypropyl triethoxysilane, gamma-methacryloxypropyl triisopropoxysilane, octyltriethoxysilane, propyltrimethoxysilane, propyltriethoxysilane, methyltrimethoxysilane, methyltriethoxysilane, polyalkyleneoxidetrimethoxysilane, 3-methacryloxypropyltrimethoxy silane, 3-methacryloxypropyltriethoxy silane and 3-methacryloxypropyltriisopropoxy silane.

27. The waterborne composition of claim 13 wherein the surfactant is at least one member selected from the group consisting of alkyl-phenol-ethoxylate surfactant, cationic surfactant, anionic surfactant, non-ionic surfactant, a polyether siloxane-based surfactant and any combination thereof.

28. The waterborne composition of claim 13 wherein the surfactant has a hydrophilic-lipophilic balance value of from about 5 to about 15.

29. The waterborne composition of claim 13 wherein the binder is selected from the group consisting organic or inorganic binders.

30. The waterborne composition of claim 29 wherein the inorganic binder is selected from the group consisting of silicates, ethyl silicates, silica nano particles solutions and silicone resins.

31. The waterborne composition of claim 29 wherein the organic binder is selected from the group consisting of non-ionic stabilized resins, anionic stabilized emulsions and cationic stabilized emulsions.

32. The waterborne composition of claim 31 wherein the organic binder is selected from the group consisting of vinylic resins, polyvinyl chlorides, vinyl chloride copolymers, vinylacetate copolymers, vinylacetates copolymers, acrylics copolymers, styrene butadiene copolymers, acrylate, acrylate copolymer, polyacrylate, styrene acrylate copolymers, phenolic resins, melamine resins, epoxy resins, polyurethane resins, alkyd resins, polyvinyl butyral resins, polyamides, polyamidoamines resins, polyvinyl ethers, polybutadienes, polyester resins, organosilicone resins, organopolysiloxane resins, nitrocellulosic resins, carboxymethyl cellulose, cellulose esters of organic acids, cellulose ethers, modified natural rubbers, natural gums, a solution of said polymers and copolymers, and any combination thereof.

33. The waterborne composition of claim 13 wherein the crosslinker is selected from the group consisting of isocyanates, epoxy curing agents, amino agents, aminoamido agents, epoxy amino adducts, carbodiimides, melamines anhydrides, polycarboxylic anhydrides, carboxylic acid resins, aziridines, titanates, organofunctional titanates and organofunctional silanes.

34. The waterborne composition of claim 32 wherein the organofunctional silane is selected from the group consisting of epoxy silanes, aminosilanes, isocyanatosilanes, methacryl silanes and vinylsilanes.

35. The waterborne composition of claim 13 wherein the pigment paste dispersion is selected from the group consisting of organic pigment dispersions and inorganic pigment dispersions.

36. The waterborne composition of claim 13 wherein the at least one epoxy silane oligomer is present in the range of about 0.05 to about 40 weight percent of the composition.

37. The cured composition of claim 13.

38. An adhesive, sealant or coating composition which comprises the waterborne composition of claim 13.

39. The waterborne composition of claim 25 wherein the aqueous solution comprises a particulate metal dispersed therein.

40. The waterborne composition of claim 39 wherein the particulate metal is selected from the group consisting of aluminum, manganese, cadmium, nickel, tin, magnesium, zinc, alloys thereof, ferroalloys and any combination thereof.

41. The waterborne composition of claim 39 wherein the particulate metal is selected from the group consisting of zinc dust, zinc flake, aluminum dust, aluminum flake, zinc aluminum alloy dust, zinc aluminum alloy flakes and any combination thereof.

42. The waterborne composition of claim 39 wherein the particulate metal is in a powder or paste dispersion form.

43. The waterborne composition of 39 wherein the particulate metal is selected from the group consisting of zinc chromate, zinc potassium chromate, zinc phosphates, alumino triphosphates, calcium magnesium phosphates, barium phosphates, aluminum zinc phosphates, molybdates, wolframates, zirconates, vanadates, zinc salts of 5-nitrophtalic acid and iron phosphide.

44. A coating composition which comprises the waterborne composition of claim 39.

45. The cured product of claim 44.

46. The process of claim 1 wherein the diol is a compound of structural Formula 2:

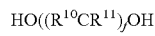

$$HO((R^{10}CR^{11})_f)OH \qquad \text{Formula 2}$$

wherein:
each occurrence of $R^{10}$ is independently selected from the group consisting of hydrogen, straight alkyl, cyclic alkyl, branched alkyl, alkenyl, aryl, aralkyl, an ether and polyether containing 1 to 20 carbon atoms;
each occurrence of $R^{11}$ is independently selected from the group consisting of hydrogen, straight alkyl, cyclic alkyl, branched alkyl, alkenyl, aryl, aralkyl, an ether and polyether containing 1 to 20 carbon atoms; and
each occurrence of the subscript f is independently an integer of from 1 to 15.

47. The process of claim 46 wherein the diol is selected from the group consisting of ethylene glycol, propylene glycol, neopentyl glycol, 1,3-propanediol, 2-methyl-1,3-propanediol, 1,3-butanediol, and 2-methyl-2,4-pentanediol.

48. The process of claim 1 wherein the reaction of the epoxy silane and water is carried out in the presence of a catalyst selected from the group consisting of ion exchange resin, an alkylammonium salt, hydroxide form of alkylammonium salt, reaction product of quaternary ammonium functional silane support selected from the group consisting of ceramic, glass, silica gel, precipitated or fumed silica, alumina and aluminosilicate.

49. The process of claim 1 wherein said water is continuously fed during the reaction.

50. The process of claim 1 wherein the molar ratio of water to silane is 0.4 to 1.0.

51. The process of claim 1 wherein the molar ratio of diol to epoxy alkoxy-substituted silane monomer and, optionally, a copolymerizable alkoxy-substituted silane other than glycidoxy and cycloaliphatic epoxy silane having two or three alkoxy groups is from 0.95 to 1.25 of stoichiometric equivalence for each alkoxy-silyl group to be transesterified.

* * * * *